United States Patent
McIntosh

(10) Patent No.: US 9,333,569 B2
(45) Date of Patent: May 10, 2016

(54) CUTTING TOOL FOR SEAMLESS GUTTER MACHINE

(71) Applicant: Tom McIntosh, Torrington, WY (US)

(72) Inventor: Tom McIntosh, Torrington, WY (US)

(73) Assignee: Tom McIntosh, Torrington, WY (US)

( * ) Notice: Subject to any disclaimer, the term of this patent is extended or adjusted under 35 U.S.C. 154(b) by 0 days.

(21) Appl. No.: 14/818,973

(22) Filed: Aug. 5, 2015

(65) Prior Publication Data

US 2016/0039018 A1 Feb. 11, 2016

Related U.S. Application Data

(60) Provisional application No. 62/033,485, filed on Aug. 5, 2014, provisional application No. 62/140,292, filed on Mar. 30, 2015.

(51) Int. Cl.
| | | |
|---|---|---|
| *B23D 19/04* | (2006.01) | |
| *B23D 23/00* | (2006.01) | |
| *E04D 13/064* | (2006.01) | |

(52) U.S. Cl.
CPC ............... *B23D 19/04* (2013.01); *B23D 23/00* (2013.01); *E04D 13/064* (2013.01); *Y10T 83/659* (2015.04); *Y10T 83/6584* (2015.04)

(58) Field of Classification Search
CPC ............ Y10T 83/0605; Y10T 83/0581; Y10T 83/0586; Y10T 83/477; Y10T 83/6584; Y10T 83/6587; Y10T 83/6588; Y10T 83/659; Y10T 83/6603; Y10T 83/6635; Y10T 83/664; Y10T 83/392; Y10T 83/393; Y10T 83/394; Y10T 83/395; Y10T 83/396; Y10T 83/40; Y10T 83/401; Y10T 83/783; Y10S 83/02; B23D 19/00; B23D 19/04; B23D 19/06; B23D 23/00; B23D 23/02; B23D 23/04; E04D 13/064

See application file for complete search history.

(56) References Cited

U.S. PATENT DOCUMENTS

| | | | | |
|---|---|---|---|---|
| 3,710,444 | A * | 1/1973 | Fishman | B26B 27/005 30/265 |
| 4,660,399 | A * | 4/1987 | Suter | B21D 5/08 72/129 |
| 5,791,222 | A * | 8/1998 | Micouleau | B23D 23/00 269/232 |
| 5,899,000 | A * | 5/1999 | Break | B26B 25/005 30/240 |
| 7,204,179 | B1 * | 4/2007 | Meyer | B23D 21/003 83/454 |
| 2005/0268469 | A1 * | 12/2005 | Fritz | B26B 25/005 30/240 |
| 2014/0190325 | A1 * | 7/2014 | Tripp | B23D 19/04 83/500 |

* cited by examiner

*Primary Examiner* — Phong Nguyen
(74) *Attorney, Agent, or Firm* — Marsh Fischmann & Breyfogle LLP

(57) ABSTRACT

A cutter for cutting a formed gutter discharged from a seamless gutter machine. The cutter may be positioned to cut a back wall of a formed gutter below a front upper edge of a front wall of the gutter. In turn, a gutter may be mounted to a building (e.g., a fascia board thereof) to achieve additional lift, thereby providing increased pitch over a given length of gutter while maintaining overlap between a gutter apron and a back upper edge of the back wall of the formed gutter.

11 Claims, 25 Drawing Sheets

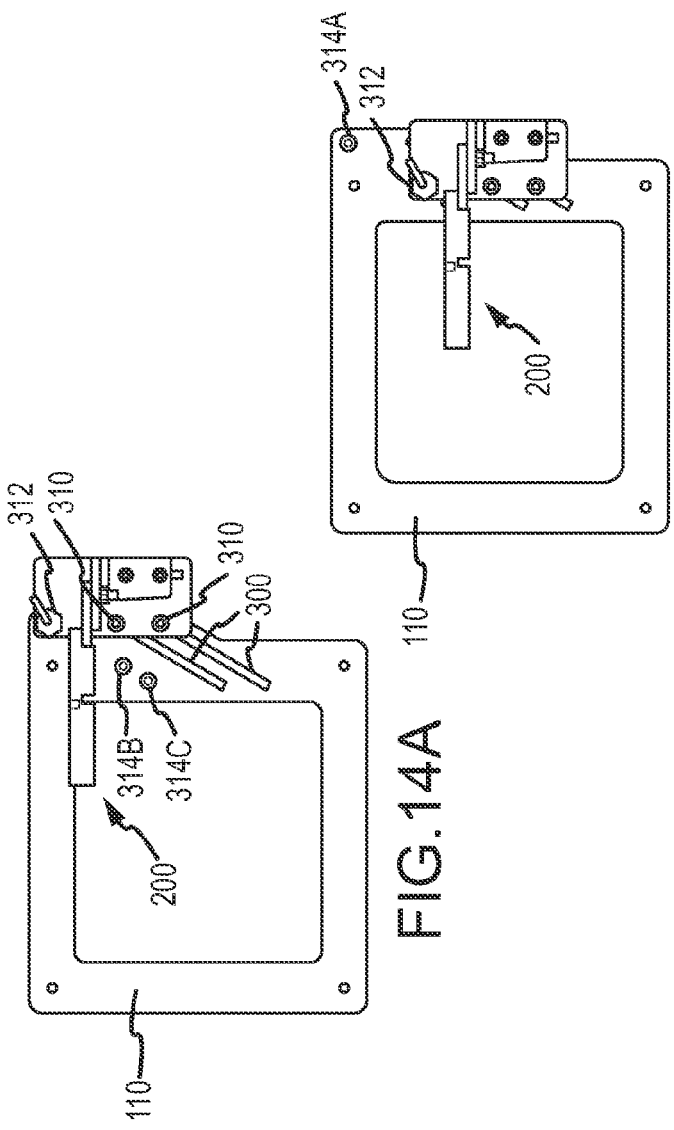

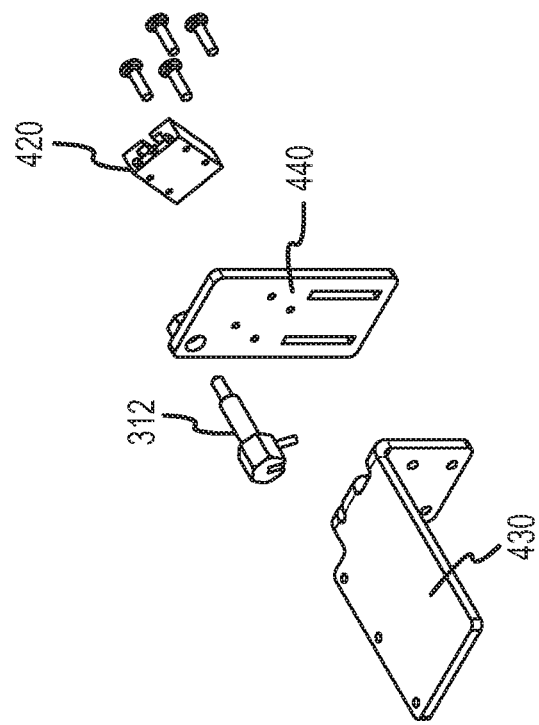
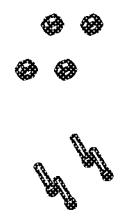
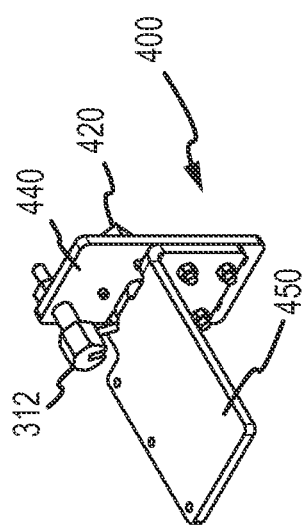
FIG. 15D
FIG. 15C

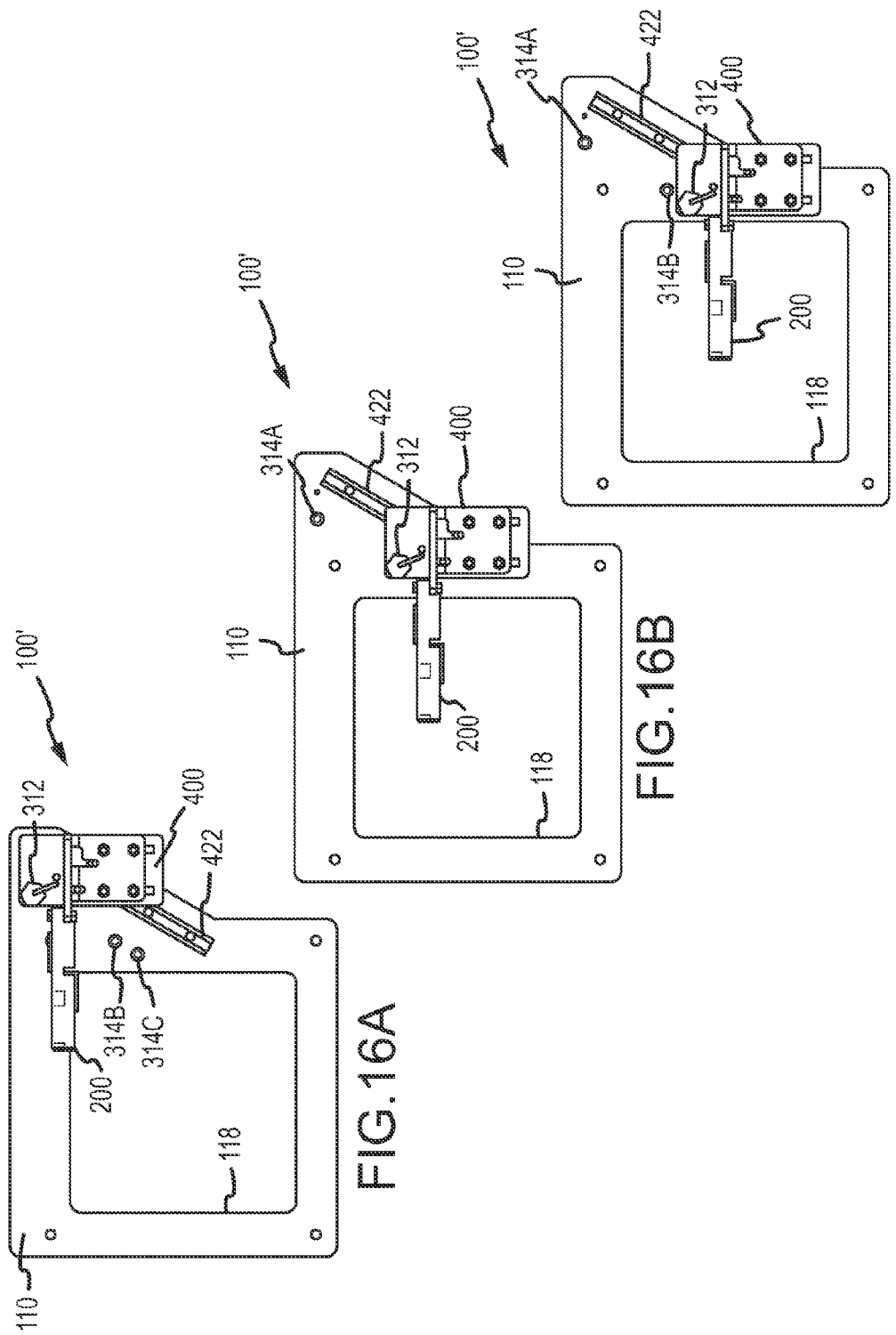

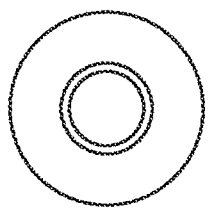
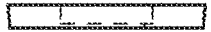
FIG.23

CUTTING TOOL FOR SEAMLESS GUTTER MACHINE

RELATED APPLICATIONS

This application claims priority from U.S. Provisional Application No. 62/033,485 filed on Aug. 5, 2014 entitled "CUTTING TOOL FOR SEAMLESS GUTTER MACHINE" and from U.S. Provisional Application No. 62/140,292 filed on Mar. 30, 2015 entitled "CUTTING TOOL FOR SEAMLESS GUTTER MACHINE," the entirety of which are both incorporated by reference herein.

BACKGROUND

Rain gutters are often affixed to a building to assist in directing runoff water from a roof or other portion of the building. Seamless gutter machines been developed that are capable of forming a continuous length of gutter. Seamless gutter machines generally act on flat stock in the form of a roll or the like that is passed through the machine. The seamless gutter machines include breaks, rollers, and other sheet material forming apparatuses arranged along the path of the sheet material through the seamless gutter machine to form a finished gutter. In turn, the continuous length of formed gutter is discharged from a discharge of the seamless gutter machine.

When affixing seamless gutters to a building, the gutters are installed to the building such that the gutters define a desired path along which water will travel. In this regard, the pitch of the gutter relative to gravity allows for the control of the flow water in the gutter. However, in various applications, it may be difficult to obtain sufficient pitch to ensure adequate water drainage in a desired direction. One such example of a scenario where additional pitch may be desired are for relatively long runs of gutters. Gutters are often affixed to a fascia board, open rafter tails, or other portion of a roof such that a gutter apron or other structure that is attached to the roof extends into a channel defined by the gutter along the back wall of the gutter. The gutter apron extends for a limited distance from the surface from which water drains into the gutter to help reduce water draining from the roof from passing behind the gutter and against the fascia board. As such, the gutter apron may have a limited dimension to extend relative to the gutter when the gutter is attached to the fascia board. As such, there may be a limited ability to provide sufficient pitch when attaching seamless gutters to maintain the overlap between the gutter apron and a back wall of the gutter.

SUMMARY

In view of the foregoing, it has been recognized that formed gutters from a seamless gutter machine may be modified to provide additional pitch over a given length of the seamless gutter. While such modification may occur in the form manually cutting a portion of the seamless gutter using scissors, snips, shears, or the like to remove material for attachment of the gutter to a building to achieve greater pitch over a given length of gutter, manual modification of gutters may be inefficient and add additional cost, complexity, and/or the potential for injury to gutter projects. In turn, the present disclosure generally relates to a cutting tool that may be fixedly connected to a seamless gutter machine to cut a formed gutter that is discharged from a seamless gutter machine. The cutting tool may be generally attached at a discharge of a seamless gutter machine. Accordingly, as the formed gutter is discharge from the seamless gutter machine, the cutting tool may act to cut the gutter along the longitudinal axis along which the formed gutter is discharged from the seamless gutter machine. That is, the cutting tool may cut along a cutting axis extending along the length of the formed gutter machine being discharge from the seamless gutter machine. The cutting tool may be passive. That is, the motion imparted on the formed gutter by the seamless gutter machine when discharging the formed gutter may drive the formed gutter relative to the cutting tool. That is, the action of the seamless gutter machine discharging the formed gutter therefrom may also drive the formed gutter relative to the cutting tool to perform the cutting operation on the formed gutter.

The trimming of the gutter as discussed herein may provide a number of significant benefits. For example, as described above, for a given length of gutter, trimming a portion of the gutter may result in the ability of providing a greater angle relative to horizontal for the given length of gutter. This may be particularly useful in applications where it is desirable to remove or relocate a downspout for cosmetic purposes or to better control the flow of water away from structure. Furthermore, where additional pitch is sought over a length of gutter, it may be necessary to mount the downstream portion of the gutter relatively low on the gutter apron. This may result in a relatively large portion of the gutter apron being exposed. As the gutter apron is often not cosmetically appealing, is desirable to have as little of the gutter apron exposed as possible. Furthermore, in certain scenarios such as a case of a settling roofline or other sagging portion of a building, it may be difficult or impossible to provide a downspout were necessary. By using a trimmed portion of gutter, it may be possible to achieve a greater pitch on the gutter to compensate for any sagging or settling a portion of the building to allow for proper drainage even in the case of a sagging or settling portion of the building. Furthermore, providing increased pitch may provide benefits in relation to reduction of sediment deposits within the gutter channel. Further still, when the portion of a gutter is mounted relatively low on the gutter apron it may be more susceptible to have water flowing from the building overtop the gutter such that the water is not directed in the channel. By providing the trimmed force in the gutter as discussed herein, the height of the gutter relative to the roof may be raised to reduce the likelihood of water overtopping the gutter upon entering the gutter channel.

The cutting tool may be specifically positioned at the discharge of the seamless gutter machine so as to cut the formed gutter at a predefined specific location of the formed gutter. Specifically, formed gutter may include a front wall having a front upper edge and a back wall having a back upper edge. The form gutter also includes a bottom wall extending between the front wall the back wall opposite the front upper edge and back upper edge. In this regard, the formed gutter may generally form a U-shaped channel. Accordingly, the cutting tool may be disposed at the discharge of the seamless gutter machine to cut a portion of the back wall of the formed gutter. Specifically, the back wall may be cut at a level below (i.e., closer to the bottom wall) than the front upper edge. It may be appreciated, removal of a portion of the back wall below the level the front upper edge may allow for the gutter to be fixed to a building (e.g., a fascia board, open rafter tail, or other structure) such that a greater pitch may be realized when mounting the gutter as compared to a gutter without any portion of the back wall removed.

In another aspect of the present invention, a cutting tool as described herein may be utilized to cut any formed sheet metal. For instance, in addition to rain gutters as described above, other forms of products may be generated by use of formed sheet metal material. One such example includes formed metal roofing material such as standing seam roofing panels. In this instance, the formed metal roofing material may also be formed by use of a machine that acts to bend, cut, or otherwise shape a sheet metal roll into a desired shape. In this regard, the cutting tool described herein may be affixed at the discharge of any sheet metal forming apparatus that forcibly passes the sheet (either prior to forming or after forming) through the cutting tool.

Accordingly, a first aspect includes a cutter for use with a seamless gutter machine. The cutter includes a cutting assembly that is supportably engaged by a frame that is attachably engageable with a seamless gutter machine adjacent to a discharge of the seamless gutter machine. The seamless gutter machine discharges a formed gutter along a longitudinal axis extending from the discharge. Specifically, the formed gutter includes a front wall having a front upper edge, a back wall having back upper edge, and a bottom wall extending between the front and back walls opposite the front and back upper edges. The cutter includes a cutting assembly having a cutting axis along which a work piece is moved to cut the work piece along the cutting axis. The cutting assembly is disposable at the discharge of the seamless gutter machine in a first position where the cutting axis is parallel to the longitudinal axis and extends along the back wall of the formed gutter a first distance from the bottom wall less than a second distance the front wall extends from the bottom wall.

A number of feature refinements and additional features are applicable to the first aspect. These feature refinements and additional features may be used individually or in any combination. As such, each of the following features that will be discussed may be, but are not required to be, used with any other feature or combination of features of the first aspect.

For instance, in one embodiment the cutting assembly may include a plurality of cutting rollers rotatably mounted to the cutting assembly and offset to have overlapping peripheral edges defining the cutting axis along which a work piece is moved through the cutting rollers to cut the work piece along the cutting axis. However, other types of cutting assemblies may be provided that are capable of cutting the gutter as it is discharged from the seamless gutter machine.

In at least some embodiments, the cutting assembly may be positionable relative to the frame between the first position and a second position. In one embodiment, when the cutting assembly is in the second position, the cutting axis is spaced apart from the formed gutter so that the cutting assembly does not contact the formed gutter. In another embodiment, when in the first position, the cutting assembly may engage formed gutter of a first size discharged from the seamless gutter machine and when in the second position, the cutting assembly engages formed gutter of a second size discharged from the seamless gutter machine.

For example, the first size of the gutter may comprise a five-inch gutter. In this embodiment, when in the first position, the cutting axis may extend along the back wall at least about 0.10 of an inch (0.25 cm) from the second upper edge. In alternative embodiments, the cutting axis may extend along the back wall at least about 0.25 of an inch (0.64 cm), at least about 0.3 of an inch (0.76), at least about 0.4 of an inch (1.0 cm), at least about 0.5 of an inch (1.3 cm), at least about 0.6 of an inch (1.5 cm), at least about 0.75 of an inch (1.9 cm), or even at least 1 inch or more (2.5 cm), from the second upper edge. Additionally, when in the first position, the cutting axis may extend along the back wall not more than about 0.75 of an inch (1.9 cm) from the second upper edge. In alternative embodiments, the cutting axis may extend along the back wall not more than about 1 inch (2.5 cm), not more than about 1.25 in (3.2 cm), not more than about 1.5 in (3.8 cm), not more than about 1.75 in (4.4 cm), not more than about 2 in (5.1 cm), not more than about 2.5 in (6.4 cm), or even not more than about 3 in (7.6 cm), from the second upper edge. The second size of the gutter may correspond to a six-inch gutter. When the cutting assembly is in the second position, the cutting axis may extend along the back wall at least about 0.625 of an inch (1.6 cm) from the second upper edge. In alternative embodiments, the cutting axis may extend along the back wall at least about 0.75 of an inch (1.9 cm), at least about 1 inch (2.5 cm), at least about 1.25 in (3.2 cm), at least about 1.5 in (3.8 cm), at least about 1.75 in (4.4 cm), at least about 2 in (5.1 cm), at least about 2.5 in (6.4 cm), or even at least about 3 in (7.6 cm), from the second upper edge. Additionally, when the cutting assembly is in the second position, the cutting axis may extend along a back wall not more than about 1 inch (2.5 cm) from the second upper edge. In alternative embodiments, the cutting axis may extend along the back wall not more than about 1.5 in (3.8 cm), not more than about 2 in (5.1 cm), not more than about 2.5 in (6.4 cm), not more than about 3 in (7.6 cm), not more than about 3.5 in (8.9 cm), or even not more than about 4 in (10 cm), from the second upper edge. In still another embodiment, a first position may correspond to a gutter of a first size, a second position may correspond to a gutter of a second size, and a third position may correspond to a position where the cutting assembly does not engage the gutter when discharged from the seamless gutter machine.

In an embodiment, the cutting assembly may be positionable relative to the frame without removal of the cutting assembly from the frame. For example, the cutting assembly may be slideably positionable relative to the frame between at least the first position and the second position. This may be the case whether the first and second position correspond to different sizes of gutters or a position where the gutter is cut and another position where the cutter does not engage the gutter.

Furthermore, the cutting wheel may be passive. That is, the cutting wheel may not be actively powered to cut the gutter. Rather, the cutting assembly may contact the formed gutter as the formed gutter is discharged from the seamless gutter machine to separate a portion of the back wall from the cutting axis to the second upper edge from the formed gutter.

A second aspect includes a method of cutting a gutter. The method includes locating a cutting assembly adjacent to a discharge of a seamless gutter machine to a dispose a cutting axis defined by the cutting assembly relative to a formed gutter discharged from the seamless gutter machine. The method further includes discharging a length of the formed gutter from the seamless gutter machine along a longitudinal axis extending from the discharge. The formed gutter includes a front wall having a front upper edge, a back wall having a back upper edge, and a bottom wall extending between the front and back walls opposite the front and back upper edges. The method further includes passing the formed gutter relative to the cutting assembly such that cutting axis intersects the back wall and cutting the back wall of the gutter along the cutting axis at a first distance from the bottom wall less than a second distance the front wall extends from the bottom wall.

A number of feature refinements and additional features are applicable to the second aspect. These feature refinements and additional features may be used individually or in any combination. As such, each of the following features that will be discussed may be, but are not required to be, used with any other feature or combination of features of the second aspect.

For instance, in an embodiment, the cutting assembly may include a plurality of cutting rollers rotatably mounted to the cutting assembly and offset to have overlapping peripheral edges defining the cutting axis along which a work piece is moved through the cutting rollers to cut the work piece along the cutting axis. In this regard, the method may also include positioning the cutting assembly relative to the frame between a first position and a second position. For instance, when the cutting assembly is in the second position, the cutting axis may be spaced apart from the formed gutter so that the cutting assembly does not contact the formed gutter. Alternatively, when in the first position, the cutting assembly may engage formed gutter of a first size discharged from the seamless gutter machine and when in the second position, the cutting assembly may formed gutter of a second size discharged from the seamless gutter machine. In particular, the cutting assembly may be positionable relative to the frame without removal of the cutting assembly from the frame. Furthermore, as described above in relation to the first aspect, the cutting wheel may be passive and contacts the formed gutter as the formed gutter is discharged from the seamless gutter machine to separate a portion of the back wall from the cutting axis to the second upper edge from the formed gutter.

BRIEF DESCRIPTION OF THE FIGURES

FIG. 8 is a left side perspective view of the discharge of a seamless gutter machine with an embodiment of the cutter supportably engage there with.

FIG. 9 is a right site perspective view of the discharge of the seamless gutter machine with an embodiment of cutter supportably engaged there with.

FIGS. 14A-14C depict an embodiment of a cutting assembly disposably positionable with respect to a frame for positioning of the cutting assembly into one of a plurality of selectable positions.

FIGS. 15A-15F are various different views of an embodiment of a cutting assembly disposably positionable with respect to a frame for positioning the cutting assembly into one of a plurality of selectable positions.

FIGS. 16A-16C depict the embodiment of the cutting assembly of FIGS. 15A-15F in a plurality of selectable positions.

FIGS. 19-24 are drawings of embodiments of individual components of the cutting assembly of FIG. 18.

DETAILED DESCRIPTION

The following description is not intended to limit the invention to the forms disclosed herein. Consequently, variations and modifications commensurate with the following teachings, skill and knowledge of the relevant art, are within the scope of the present invention. The embodiments described herein are further intended to explain modes known of practicing the invention and to enable others skilled in the art to utilize the invention in such, or other embodiments and with various modifications required by the particular applications(s) or use(s) of the present invention.

Figure 1:
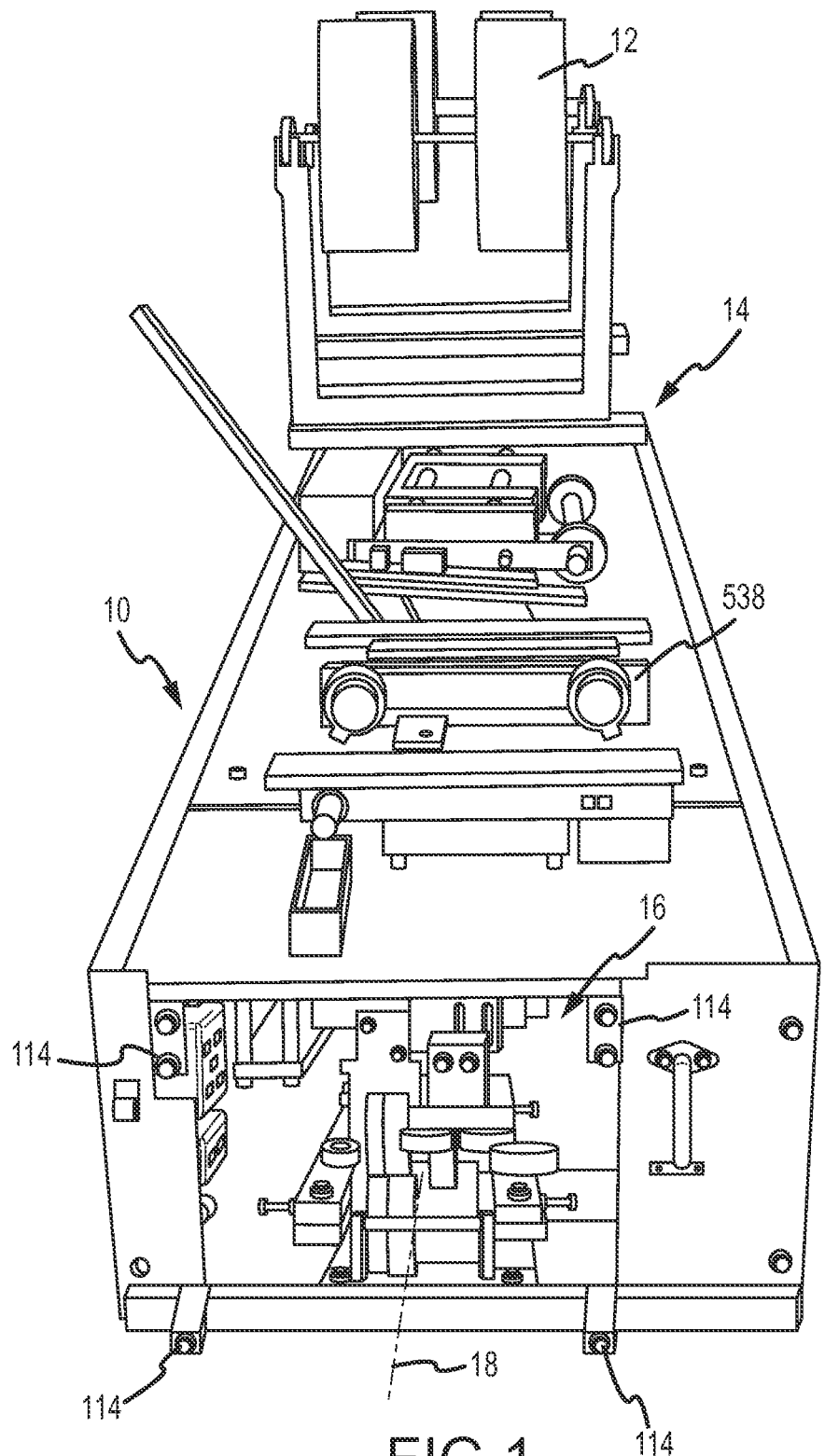
FIG. 1 is a perspective view of a prior art seamless gutter machine.
Figure 2:
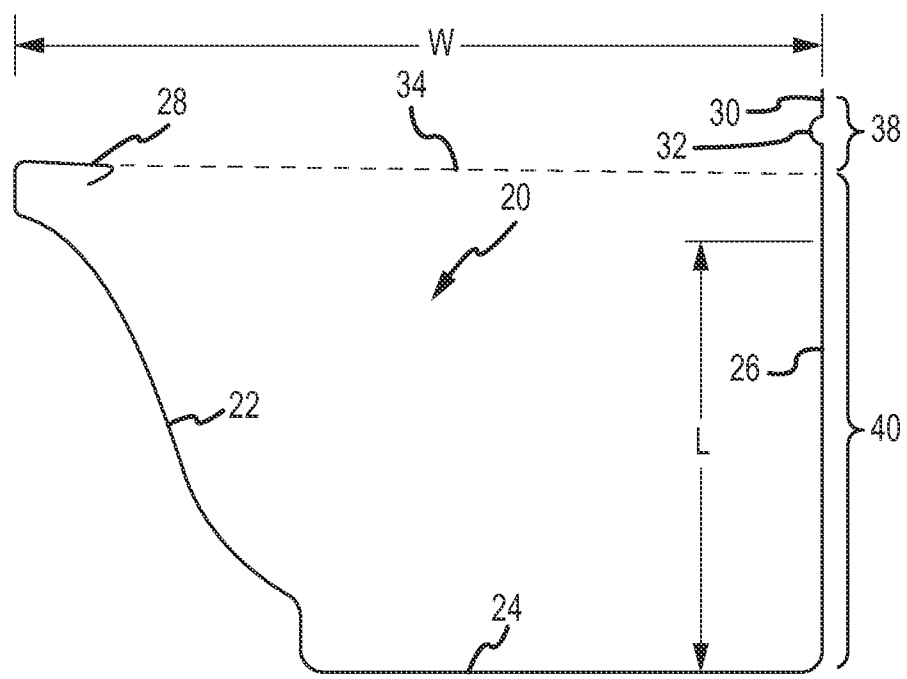
FIG. 2 is a side profile view of an embodiment of a formed gutter.

FIG. 1 illustrates a prior art example of a seamless gutter machine 10. The seamless gutter machine 10 generally includes rolls of sheet material 12 that are fed into a rear portion 14 of the seamless gutter machine 10. The seamless gutter machine includes a number of breaks, rollers, cams, anvils, and/or other sheet forming tools disposed within the seamless gutter machine 10 that operate on the sheet material entering the rear portion 14 of the seamless gutter machine 10. Accordingly, as the sheet material 12 is fed into the rear portion 14 of the machine 10 and is advanced toward a discharge 16 (e.g., by drive rollers within the seamless gutter machine), the sheet material is bent, creased, folded, and/or otherwise shaped into a formed gutter product that is discharged from the discharge 16 of the seamless gutter machine 10. In an embodiment, the formed gutter 20 may have a cross-sectional profile as depicted in FIG. 2. In any regard, the formed gutter 20 is generally discharged along a longitudinal axis 18 extending from the seamless gutter machine 10.

With further reference to FIG. 2, there is depicted an embodiment of a cross-sectional profile the formed gutter 20. The formed gutter 20 generally includes a front wall 22, a bottom wall 24, and a back wall 26. The front wall 22 may include a front upper edge 28 and the back wall may include a back upper edge 30. As appreciated in FIG. 2, the front upper edge 28 and the back upper edge 30 may be disposed on sides of the respective front wall 22 and back wall 26 opposite the bottom wall 24. In this regard, the formed gutter 20 may generally include a U-shaped cross-section that may define a channel through which water may be directed (e.g., when attached to a building or the like). As can further be appreciated in FIG. 2 the front wall 22 may include contours including, for example, lips, curves, or folds. Such contours may be provided for structural rigidity of the formed gutter 20 and/or for decorative purposes. The back wall 26 may also include a rolled bead portion 32 to provide structural rigidity to the back wall 26. The formed gutter 20 may define a front upper edge plane 34 at the front upper edge 28. It may further be appreciated, the back wall 26 of the formed gutter 20 may generally extend above (e.g., further from the bottom wall 24) than the front upper edge plane 34. The form gutter product 20 may be formed in various different standardized sizes and formats, all with the general shape described above including a front wall, bottom wall, and back wall. For instance, the cutter described herein may be used with K-style or fascia style gutters. With respect to K-style gutters, for example, some seamless gutter machines 10 may be operative to form five inch K-style formed gutter product, wherein the distance from the widest extent of the form gutter product (designated as W in FIG. 2) measures 5 inches (12.7 cm). Additionally, some seamless gutter machines 10 may be operative form six inch K-style form gutter product, wherein the distance from the widest extent of the formed gutter (W) is 6 inches (15.2 cm). While one particular cross-sectional profile of formed gutter 20 is depicted in FIG. 2, it may be appreciated that other profiles may be provided without limitation that generally include a front wall 22, bottom wall 24, and back wall 26, the front wall 22 having a front upper edge 28 and the back wall 26 having a back upper edge 30.

Figure 3:
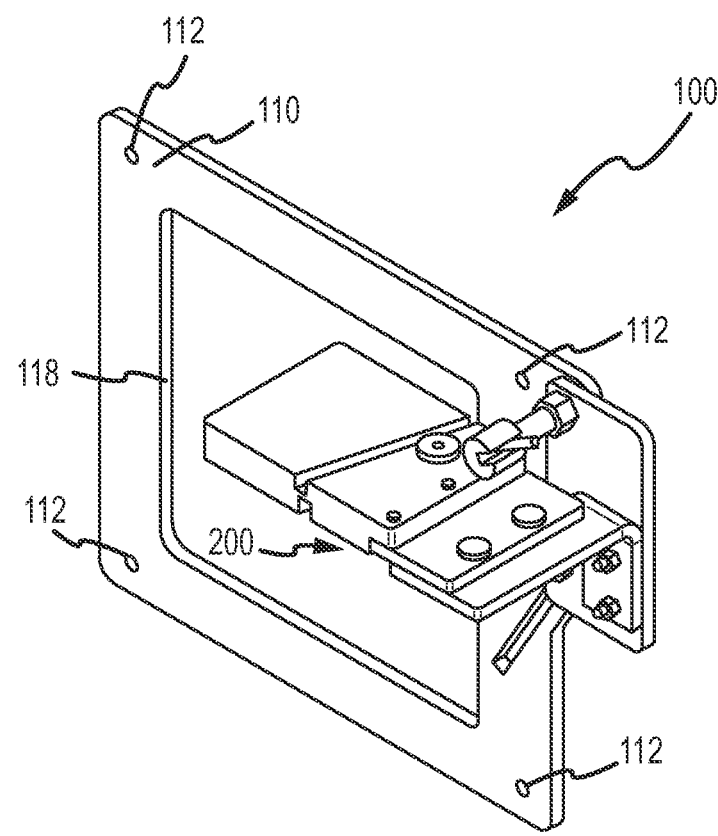
FIG. 3 is a perspective view of an embodiment of a cutter.

With further reference to FIG. 3, an embodiment of a cutter 100 is depicted. The cutter 100 may include a cutting assembly 200 that is supportably engaged by a frame 110. The frame 110 may include a plurality of mounting holes 112. The mounting holes 112 may generally correspond to mounting locations 114 provided at the discharge 16 of the seamless gutter machine depicted in FIG. 1. The location of the mounting locations 114 may be standardized for at least some seamless gutter machines 10. For example, a proprietary standard may exist for a particular manufacturer of seamless gutter machines and/or an industry-wide standard may be adopted by a number of different manufacturers of seamless gutter machines. Any regard, the frame 110 may be securely mountable adjacent to the discharge 16 of the seamless gutter machine 10. While coordination of mounting holes 112 and fasteners at the mounting locations 114 are depicted herein, other means of attachment of the frame 110 adjacent to the discharge 16 of the seamless gutter machine 10 may be provided without limiting the scope of the present disclosure. Such additional potential attachment mechanisms may include, but are not limited to, a welded attachment, a clamping attachment, an adhesive attachment, use of straps, etc. In at least some embodiments the frame 110 may also be integrated into the seamless gutter machine 10.

For instance, the cutter 100 may be attached (e.g., the frame 110) may be attached directly to the discharge of the seamless gutter machine 10. Additionally or alternatively, the cutter 100 may be attached to another structure adjacent to the discharge of the seamless gutter machine 10. For instance, a guillotine cutter or other device for severing the discharged from the seamless gutter machine 10 may also be provided at the discharge of the seamless gutter machine 10. In this regard, the cutter 100 may be attached to the guillotine cutter or other device attached to the discharge of the seamless gutter machine 10. Furthermore, the cutter 100 may be a standalone device that is positionable near the discharge of the seamless gutter machine 10. For example, the cutter 10 may be supported by a separate structure (e.g., a stand or the like) that may be positionable adjacent to the discharge of the seamless gutter machine 10.

In any regard, the frame 110 may define an aperture 118 through which formed gutter 20 may pass when discharged from the discharge 16 of the seamless gutter machine 10. In other embodiments, the aperture 118 may be defined by the seamless gutter machine 10 itself or another device (e.g., a guillotine cutter or the like). In this regard and as will be described in greater detail below, the frame 110 may simply position the cutting assembly 200 in a position relative to the discharge of the seamless gutter machine 10. As such, the cutter 100 may include a cutting assembly 200 is disposed relative to the frame 110 such that the cutting assembly 200 extends relative to the aperture 118 or portion of the frame 110. In this regard, the cutting assembly 200 may be disposed relative to the aperture 118 and/or frame 110 so as to operationally engage the formed gutter 20 when discharged from a seamless gutter machine 10 to which the frame 110 is attached to cut a portion of the formed gutter 20 in a manner described in more detail below.

Figure 4:
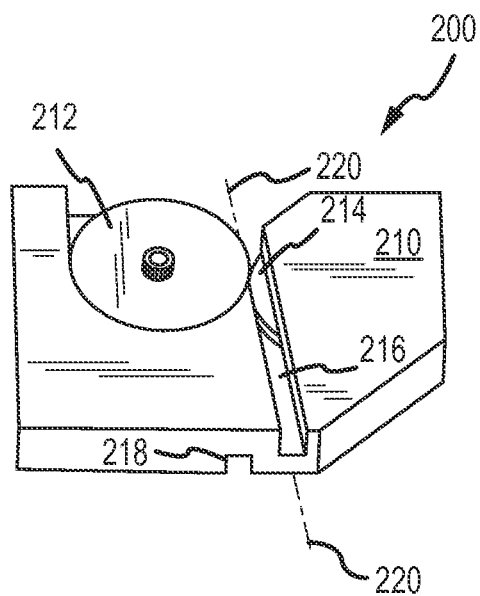
FIG. 4 is a front perspective view of an embodiment of a cutting assembly.
Figure 5:
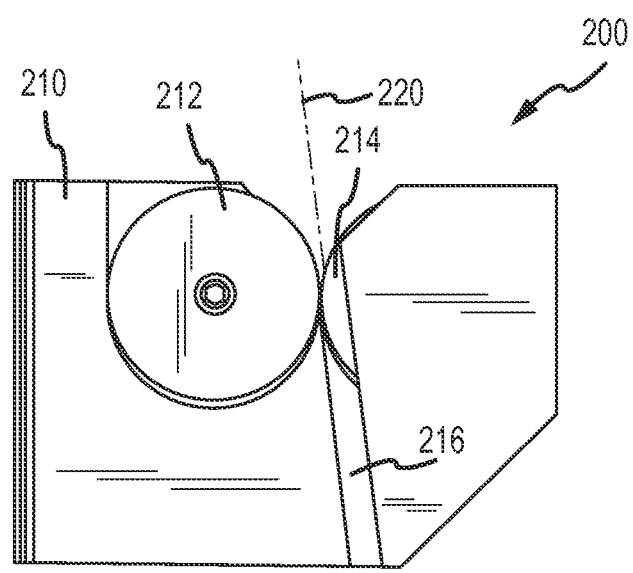
FIG. 5 is a top view of an embodiment of a cutting assembly.
Figure 6:
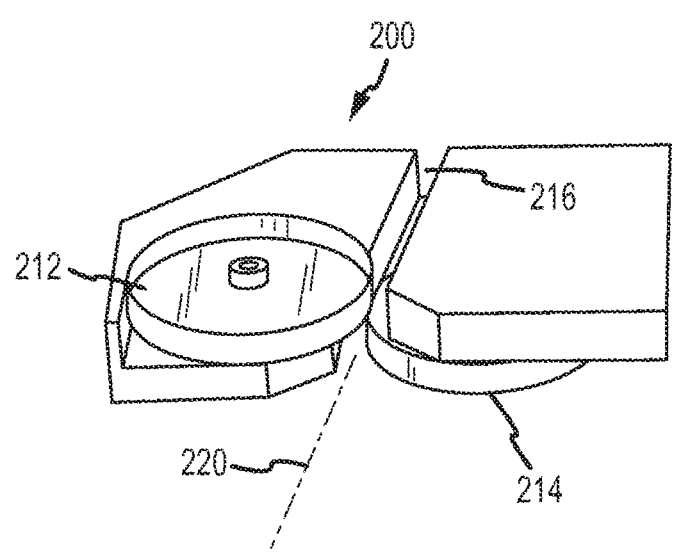
FIG. 6 is a rear perspective view of an embodiment of a cutting assembly.

With further reference to FIGS. 4, 5, and 6, an embodiment of a cutting assembly 200 is depicted. However, it may be appreciated that other sheet metal cutting devices may be utilized that are capable of cutting a sheet material and the specific cutting assembly 200 described herein is exemplary and not limiting. For example, the cutting assembly may include blades or other cutting devices other than those described below. In this regard, the cutting assembly may include sharpened cutting edges, anvils, breaks, or other mechanisms for cutting the gutter being discharged. However, with further reference to the specific embodiment of the cutting assembly 200, the cutting assembly 200 may include a body 210 to which and upper cutting roller 212 and a lower cutting roller 214 are mounted. The upper cutting roller 212 and the lower cutting roller 214 may be mounted for rotational movement relative to a central axis of the respective roller 212 or 214. The body 210 may define an upper material channel 216 and a lower material channel 218. As best appreciated in FIG. 6, the upper cutting roller 212 may be overlappingly positioned with the lower cutting roller 214. That is, the upper cutting roller 212 and the lower cutting roller 214 may have overlapping peripheral edges. To this end, the upper cutting roller 212 may be offset from the lower cutting roller 214 in a direction corresponding to the respective axis of rotation of each respective roller 212 and 214.

Accordingly, the cutting assembly 200 may define a cutting axis 220 along which sheet material may be advanced relative to the cutting assembly 200. Upon engagement of the sheet material advanced along the cutting axis 220 with the upper and lower cutting rollers 212 and 214, the overlapping peripheral edges of the upper cutting roller 212 and lower cutting roller 214 may shear the sheet material along the cutting axis 220. In this regard, a first cut side of the sheet material may be advanced in the upper material channel 216 and a second cut side of the sheet material may be advanced in the lower material channel 218. Accordingly, the cutting assembly 200 may shear the sheet material as it is advanced along the cutting axis 220 relative to the cutting assembly 200 to separate a first portion of the sheet material from the remainder of the sheet material.

Figure 7:
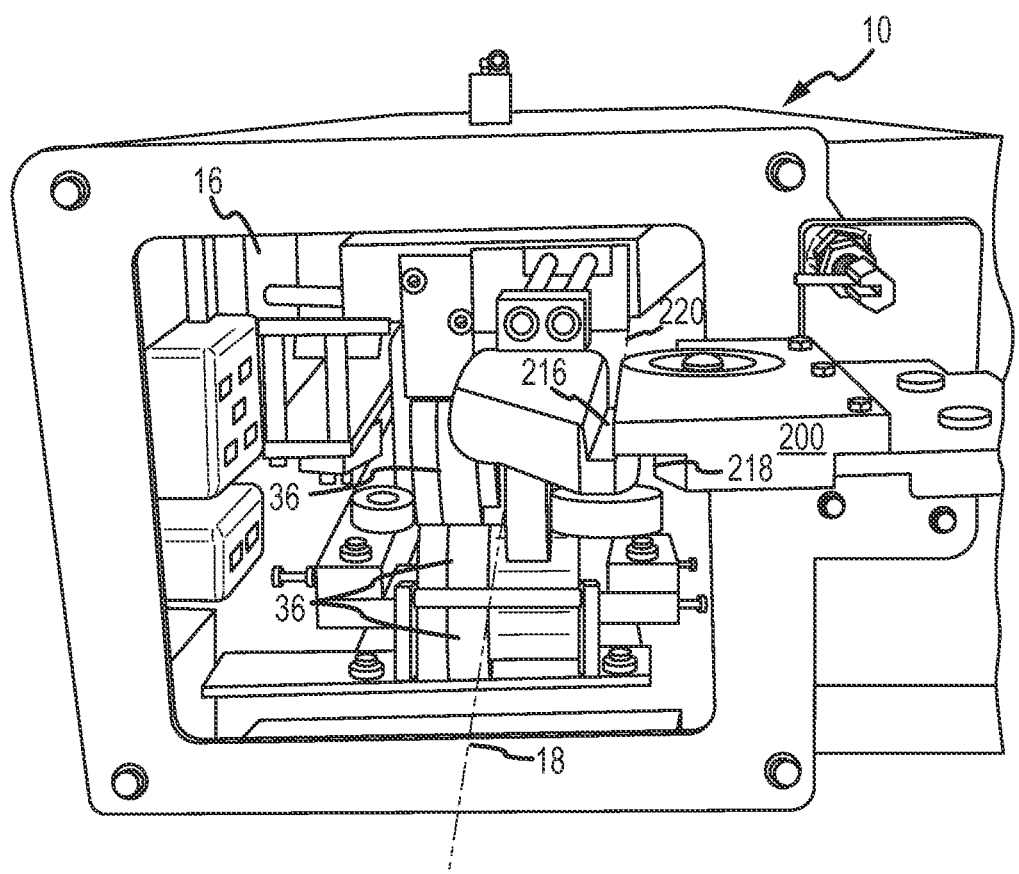
FIG. 7 is a front view of an embodiment of a cutter supportably engaged discharge of a seamless gutter machine.
Figure 8:
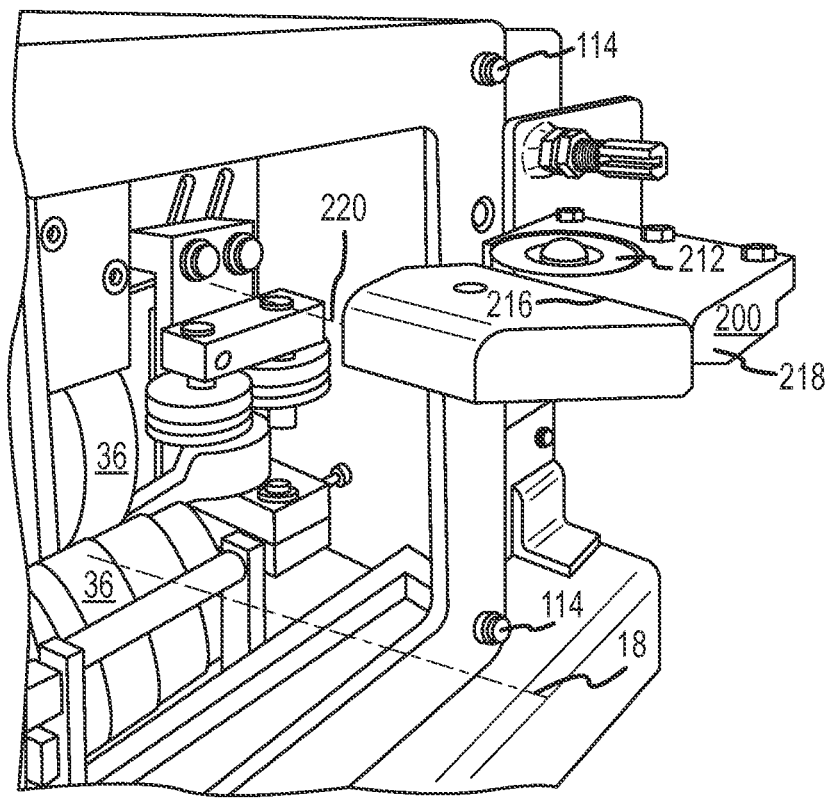
Figure 9:
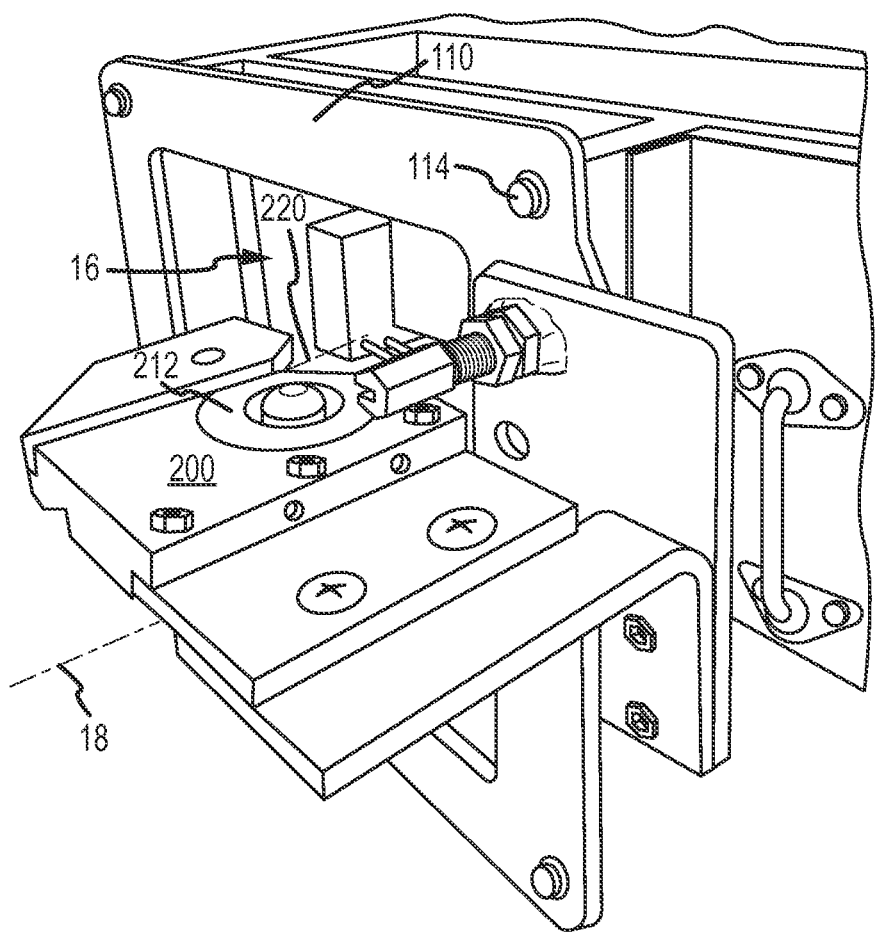
Figure 10:
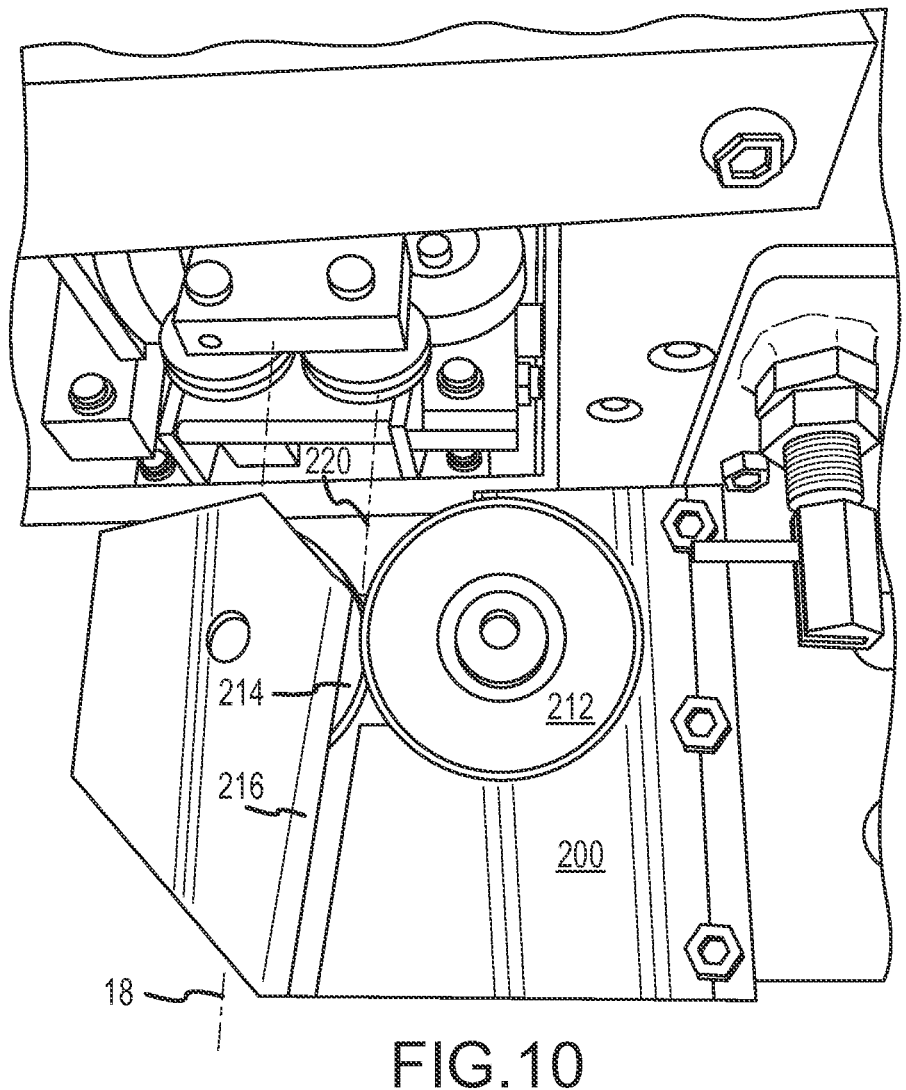
FIG. 10 is a top view of a cutting assembly supportably engaged relative to a discharge of seamless gutter machine.

Accordingly, with further reference to FIGS. 7-10, when the cutting assembly 200 is disposed adjacent to the discharge 16 of the seamless gutter machine 10. As may be appreciated from FIG. 7, the cutting assembly 200 may be disposed such that the cutting axis 220 is generally arranged parallel to the longitudinal axis 18 along which the formed gutter 20 is discharged from the seamless gutter machine 10. As such, when the form gutter 20 is discharged from the seamless gutter machine 10, the formed gutter 20 may impinge on the cutting assembly 200. For example, as can be seen in FIG. 7, the seamless gutter machine 10 may include drive rollers 36 that forcibly discharge the formed gutter 20 along the longitudinal axis 18. The cutting assembly 200 may be positioned relative to the discharge 16 to engage a back wall 26 of the form gutter 20. For instance, as best shown in FIG. 2 in relation to the formed gutter 20 cross section, the cutting assembly 200 may be positioned such that the cutting axis 220 engages the back wall 26 at a distance L from the bottom wall 24. As may be appreciated, the result may be the back wall 26 being cut at the distance L from the bottom wall 24 such that an upper portion 38 of the back wall 26 may be severed from the remainder of the formed gutter 20. Accordingly, a remaining intact section 40 of the back wall 26 adjacent the bottom wall 24 may continue along a path through the lower material channel 218. The severed upper portion 38 adjacent to the back upper edge 30 may be severed from the back wall 26 and be diverted through the upper material channel 216.

Of particular note, the cutting axis 220 may intersect the back wall 26 at the distance L from the bottom wall 24 such that the back wall 26 is cut below (i.e., nearer the bottom wall 24) the level of the upper edge plane 34. That is, the cutting axis 220 may intersect the back wall 26 a distance from the bottom wall 24 less than the distance the front wall 22 extends from the bottom wall 24. As will be discussed in greater detail in relation to FIGS. 17A, 17B, and 17C below, this may assist in attachment of the formed gutter 20 to achieve a greater pitch (e.g., more of an angle relative to horizontal) over a given distance of gutter run.

Figure 11:
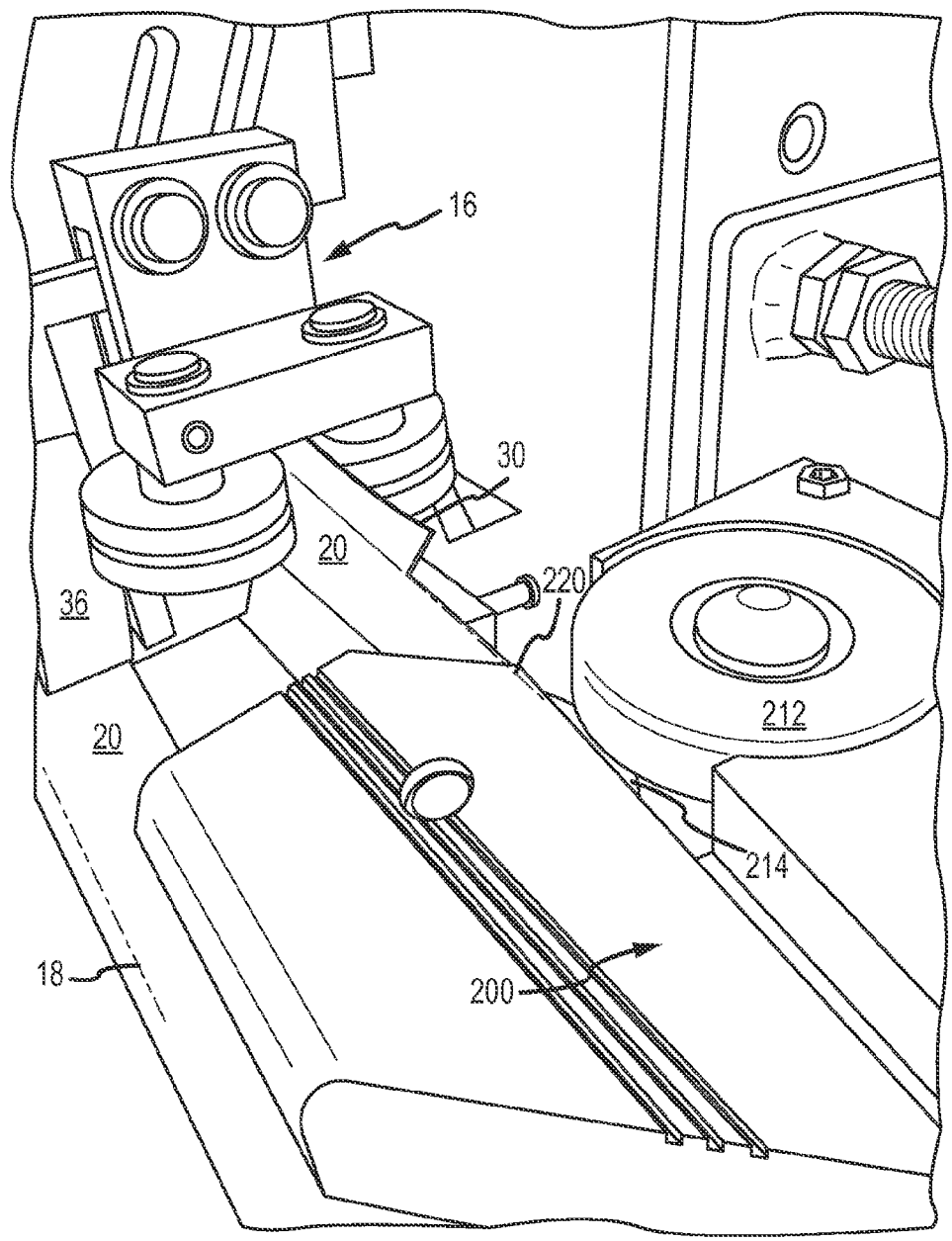
FIGS. 11-13 are perspective views illustrating progressive engagement of a back wall of a formed gutter with the cutting assembly supportably engaged discharge of the seamless gutter machine.
Figure 12:
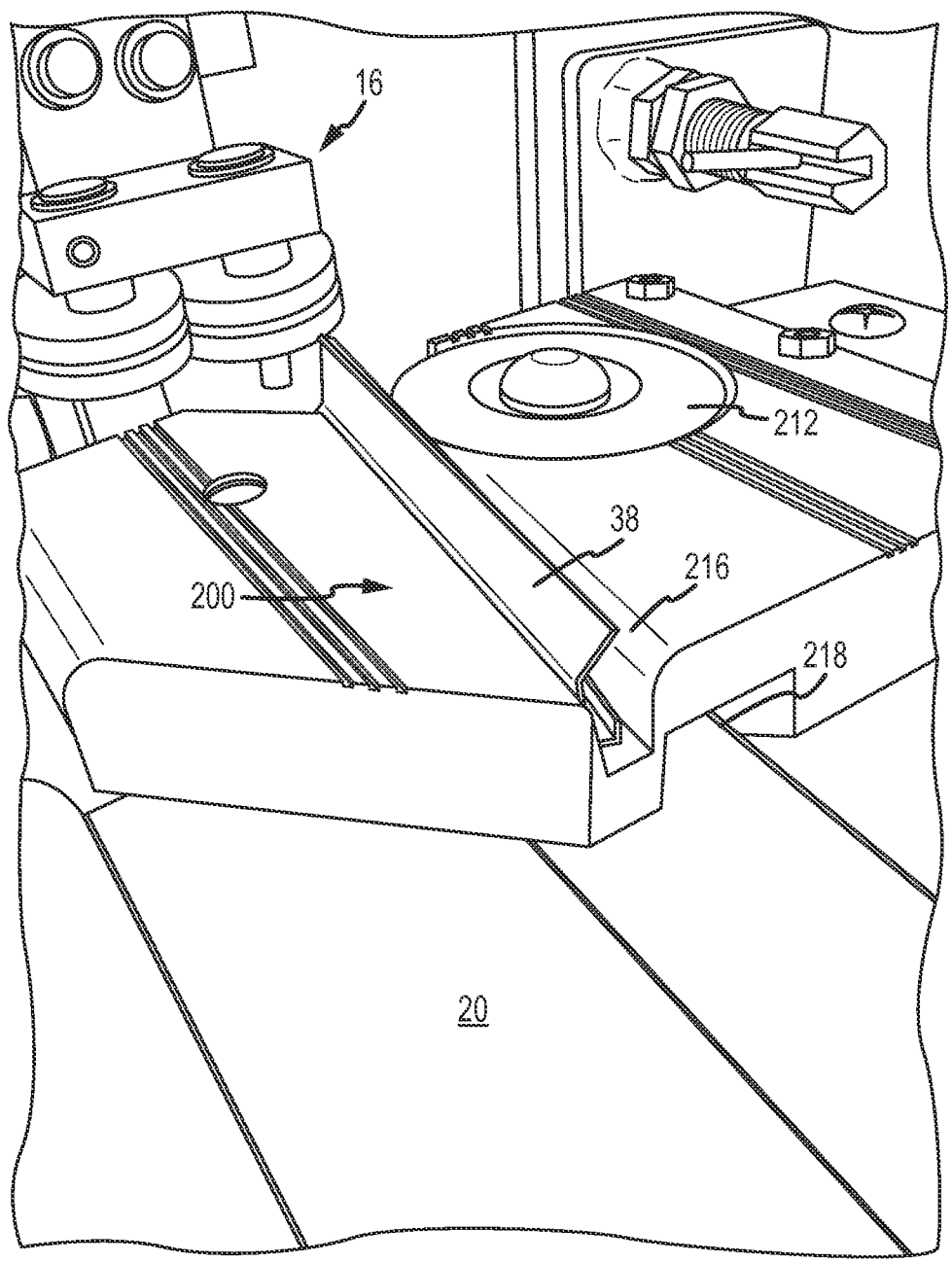
Figure 13:
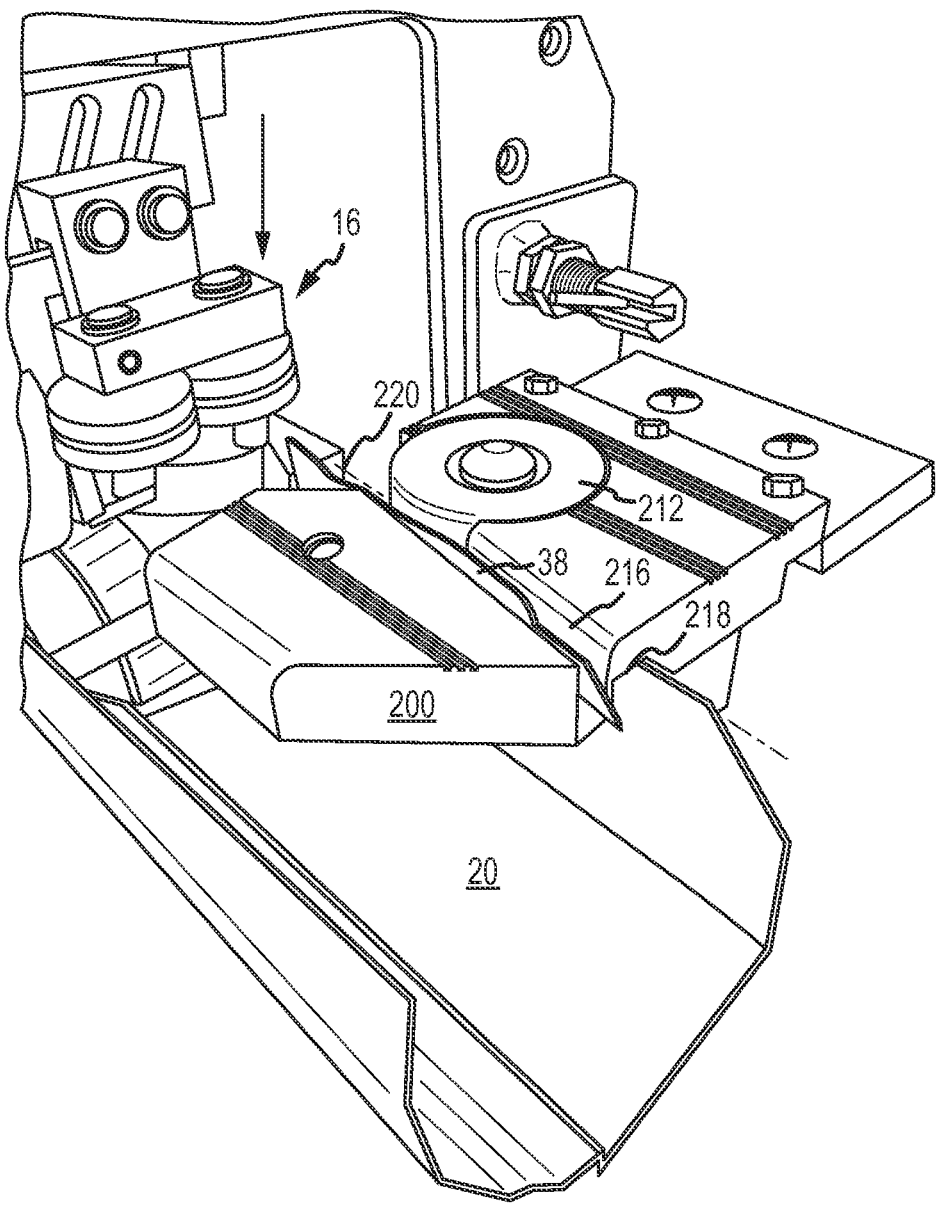

FIGS. 11-13 depict progression of a formed gutter 20 being discharged from the discharge 16 of the seamless gutter machine 10. In this regard, in FIG. 11, the back wall 26 of the formed gutter 20 is discharged from the seamless gutter machine 10 along the longitudinal axis 18 such that the back wall 26 is aligned with the cutting axis 220 as described above. As may be appreciated, the upper edge portion 30 of the back wall 26 may extend above the interface of the overlapping peripheral edges of the upper cutting roller 212 and the lower cutting roller 214. In this regard, as the formed gutter 20 is discharged by the drive rollers 36, the back wall 26 impinges upon the overlapping peripheries of the upper cutting roller lower 212 and the lower cutting roller 214. That is, the back wall 26 intersects the cutting axis 220 of the cutting assembly 200. As such, upon advancement of the formed gutter 20 relative to the cutting assembly 200, the upper portion 38 of the back wall 26 may be cut from the remainder formed gutter 20. This is depicted in FIGS. 12 and 13 (depicting different sizes of formed gutter 20) where the formed gutter 20 has been further advance with respect to the cutting assembly 200 such that the upper portion 38 of the back wall 26 is severed from the back wall 26 and directed into the upper material channel 216 and away from the remainder of the formed gutter portion 20 that continues through the lower material channel 218.

With further reference to FIGS. 14A-14C, the cutting assembly 200 may be adjustable with respect to the frame 110. In this regard, FIG. 14A depicts the cutting assembly 200 in a first position relative to the frame 110, FIG. 14B depicts the cutting assembly 200 in a second position relative to the frame 110, and FIG. 14C depicts the cutting assembly 200 in a third position relative to the frame 110. As can be appreciated best in FIG. 14A, the frame 110 may include a plurality of slots 300 through which guide bolts 310 are disposed. The guide bolts 310 may pass through the cutting assembly 200. In this regard, the cutting assembly 200 may be slidable relative to the frame 110 as the guide bolts 310 may slide relative to the slots 300. In this regard, the cutting assembly 200 may be slideably positionable between the 3 positions depicted in FIGS. 14A, 14B, and 14C.

Furthermore, the cutting assembly 200 may include an index pin 312. The index pin 312 may be positioned into one of a plurality of indexing holes 314A, 314B, or 314C provided in the frame 110. For example, indexing hole 314A be provided in the frame 110 such that when the indexing pin 312 is disposed in indexing hole 314A, the cutting assembly 200 is in the first position as shown in FIG. 14A. The first position shown in FIG. 14A may dispose the cutting assembly 200 away from the formed gutter 20 at the discharge 16 of the seamless gutter machine 10 such that the cutting assembly 200 does not contact the formed gutter 20 when discharged from the seamless gutter machine 10. As such, FIG. 14A may correspond to a position of the cutting assembly 200 wherein the cutting assembly 200 does not engage the formed gutter 20 discharged from the seamless gutter machine 10. The cutting assembly may also be slidingly positioned relative to the frame such that the indexing pin 312 is selectively provided in indexing hole 314B or 314C for positions shown in FIGS. 14B and 14C, respectively. In this regard, index holes 314B and 314C may correspond to different positions of the cutting assembly 200 to engage correspondingly different sizes of gutters as discussed above in relation to FIG. 2. For example, in FIG. 14B, cutting assembly 200 may be position for engagement of the back wall 26 of a six inch gutter, whereas in FIG. 14C, the cutting assembly 200 may be disposed for engagement with the back wall 26 of a 5 inch gutter. In any regard, a plurality of different positions may be established for the cutting assembly 200 such that the cutting assembly 200 engages different sizes of formed gutter discharged from the seamless gutter machine 10 and/or provides the cutting assembly 200 in a position spaced away from the discharged formed gutter 20 such that the cutting assembly 200 does not engaged the form gutter 20.

When in a position to cut a five inch K-style gutter, the cutting assembly 200 may engage the back wall 26 of the gutter a distance of at least about 0.1 of an inch (0.25 cm) from the back upper edge. Alternatively, the cutting assembly 200 may engage the back wall 26 at least about 0.25 of an inch (0.64 cm), at least about 0.3 of an inch (0.76), at least about 0.4 of an inch (1.0 cm), at least about 0.5 of an inch (1.3 cm), at least about 0.6 of an inch (1.5 cm), at least about 0.75 of an inch (1.9 cm), or even at least 1 inch or more (2.5 cm), from the back upper edge. When in this position, the cutting assembly may engage the back wall 26 of the gutter a distance not more than about 0.75 of an inch (1.9 cm) from the back upper edge. In alternative embodiments, the cutting assembly 200 may engage the back wall 26 not more than about 1 inch (2.5 cm), not more than about 1.25 in (3.2 cm), not more than about 1.5 in (3.8 cm), not more than about 1.75 in (4.4 cm), not more than about 2 in (5.1 cm), not more than about 2.5 in (6.4 cm), or even not more than about 3 in (7.6 cm), from the back upper edge. Additionally, when in a position to cut a six inch K-style gutter, the cutting assembly may engage the back wall 26 of the gutter a distance at least about 0.625 of an inch (1.6 cm) from the back upper edge. In alternative embodiments, the cutting assembly 200 may engage the back wall 26 at least about 0.75 of an inch (1.9 cm), at least about 1 inch (2.5 cm), at least about 1.25 in (3.2 cm), at least about 1.5 in (3.8 cm), at least about 1.75 in (4.4 cm), at least about 2 in (5.1 cm), at least about 2.5 in (6.4 cm), or even at least about 3 in (7.6 cm), from the back upper edge. When in this position, the cutting assembly may engage the back wall 26 of the gutter a distance of not more than about 1 inch (2.5 cm) from the back upper edge. In alternative embodiments, the cutting assembly 200 may engage the back wall 26 not more than about 1.5 in (3.8 cm), not more than about 2 in (5.1 cm), not more than about 2.5 in (6.4 cm), not more than about 3 in (7.6 cm), not more than about 3.5 in (8.9 cm), or even not more than about 4 in (10 cm), from the back upper edge. In an embodiment, the cutting assembly 20 may cut the gutter along a longitudinal axis of the formed gutter such that the cutting axis is parallel to the length of the gutter. In other embodiments, at least a portion of the cut may be made such that the cutting axis extends toward the back upper edge (e.g., so as to taper the amount of material removed from the gutter for at least a portion of the cut).

Figure 15B:
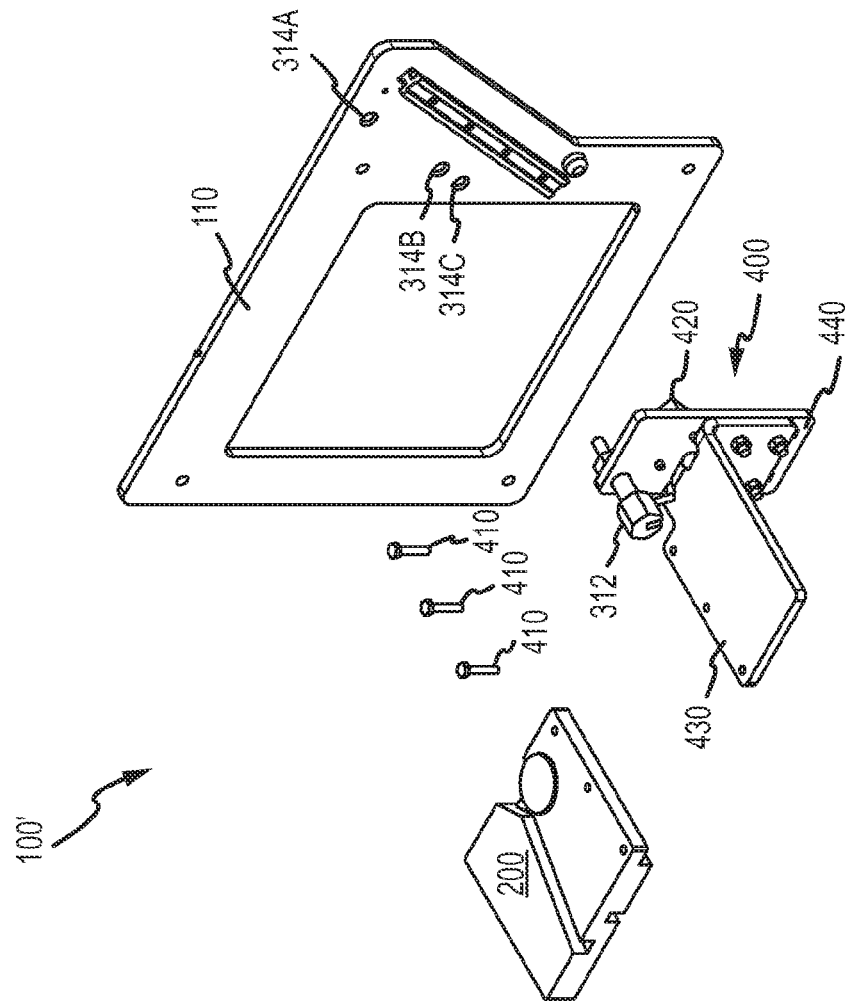
Figure 15A:
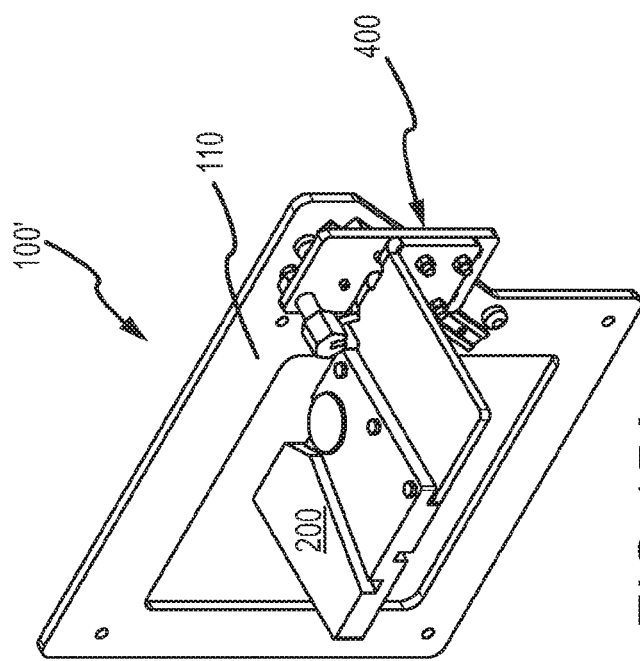
Figure 15F:
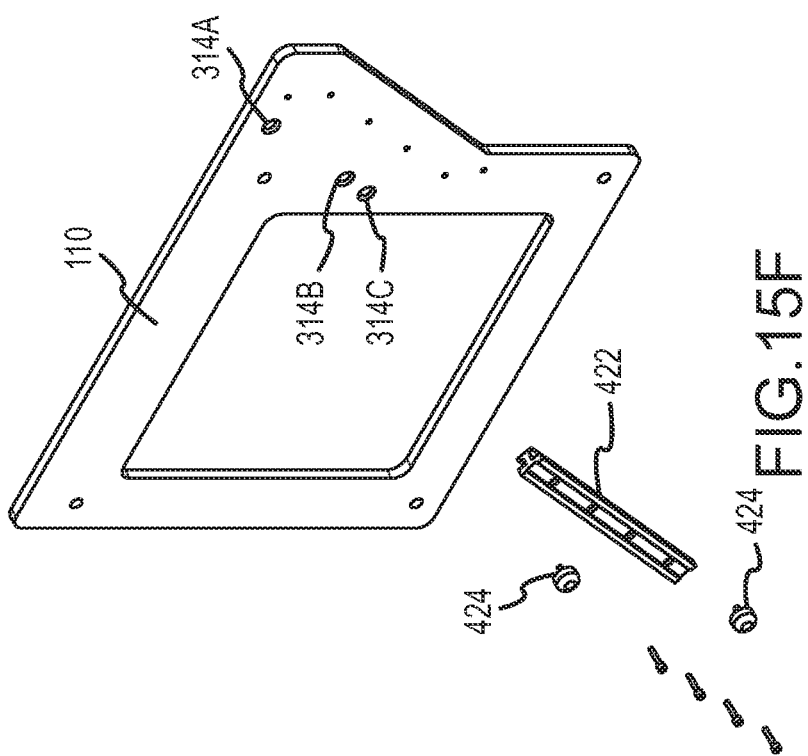
Figure 15E:
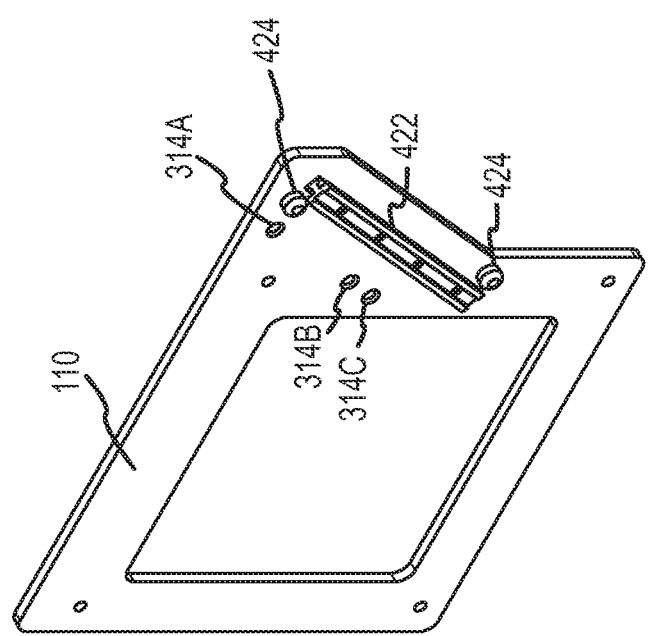

A further embodiment of a cutter 100' is shown in FIGS. 15A-16C. In FIG. 15A the cutter 100' is shown assembled. In FIG. 15B the cutter 100' is shown in an exploded view. FIGS. 15C, 15D, 15E, and 15F show detailed views of various components of the cutter 100'. Finally 16A, 16B, and 16C show the cutting assembly 200 of the cutter 100' in a first, second, and third position respectively. The following description of the cutter 100' uses like reference numerals for like elements.

Thus, with collective reference to FIGS. 15A-15F, the cutter 100' may include a cutting assembly 200 as described above. The cutting assembly 200 may be supportably engaged by a slider assembly 400. For instance, the cutting assembly 200 may be mounted to the slider assembly 400 by way of fasteners 410. In an application, the cutting assembly 200 may be integrally provided with the slider assembly 300.

The slider assembly 400 may include a platform 430 that supportably engages the cutting assembly 200. The platform 430 may be engaged with a mounting plate 440. A slider 420 may be attached to the mounting plate 440 on a side opposite the platform 430. The mounting plate 440 may also receive an indexing pin 312.

The frame 110 may have a rail 422 mounted thereto. The slider 420 may engage the rail 422 and be slidable with respect to the rail 422. The rail 422 may have bumpers 424 disposed at opposite ends of the rail 422 to prevent the slider 420 from sliding off either or both ends of the rail 422.

When the sliding assembly 400 is slideably positioned relative to the rail 422, the indexing pin 312 may be selectively disposable in one of a plurality of indexing holes 314A, 314B, 314C to position the cutting assembly 200 in a first, second, or third position, respectively, as described above. The slider 420 may engage the rail 422 with machined surface bearings, a roller bearing interface, or any other appropriate bearing surface to promote a low friction sliding relation between the slider 420 and the rail 422. As such, the cutting assembly 200 may be easily positioned between the plurality of positions defined by engagement of the indexing pin 312 relative to the indexing holes 314A, 314B, and 314C.

Accordingly, with further reference to FIGS. 16A, 16B, and 16C, the cutter 100' including the slider assembly 400 is shown in a plurality of positions similar to those described above in relation to FIGS. 14A, 14B, and 14C. That is, in FIG. 16A, the slider assembly 400 may be positioned relative to the rail 422 such that the indexing pin 312 is positionable in indexing hole 314A (not shown in FIG. 16A, shown in FIGS. 16B and 16C). In the first position shown in FIG. 16A, the cutting assembly 200 may be disposed such that the cutting assembly 200 does not engage a formed gutter 200 which passes through the aperture 118 of the frame 110. In FIG. 16B, the slider assembly 400 may be positioned relative to the rail 422 such that the indexing pin 312 is positionable in indexing hole 314B (shown in FIG. 16A) to position the cutting assembly 200 in a second position. In the second position shown in FIG. 14B, the cutting assembly 200 may be disposed relative to the frame 110 such that a formed gutter of a first size (e.g., a six inch gutter) is engaged by the cutting assembly 200 such that an upper portion 38 of the back wall 26 is cut therefrom as described above. In FIG. 16C, the slider assembly 400 may be positioned relative to the rail 422 such that the indexing pin 312 is positionable in indexing hole 314C (shown in FIG. 16A) to position the cutting assembly 200 in a third position. In the third position shown in FIG. 14C, the cutting assembly 200 may be disposed relative to the frame 110 such that a formed gutter of a second size (e.g., a five inch gutter) is engaged by the cutting assembly 200 such that an upper portion 38 of the back wall 26 is cut therefrom as described above.

Figure 18:
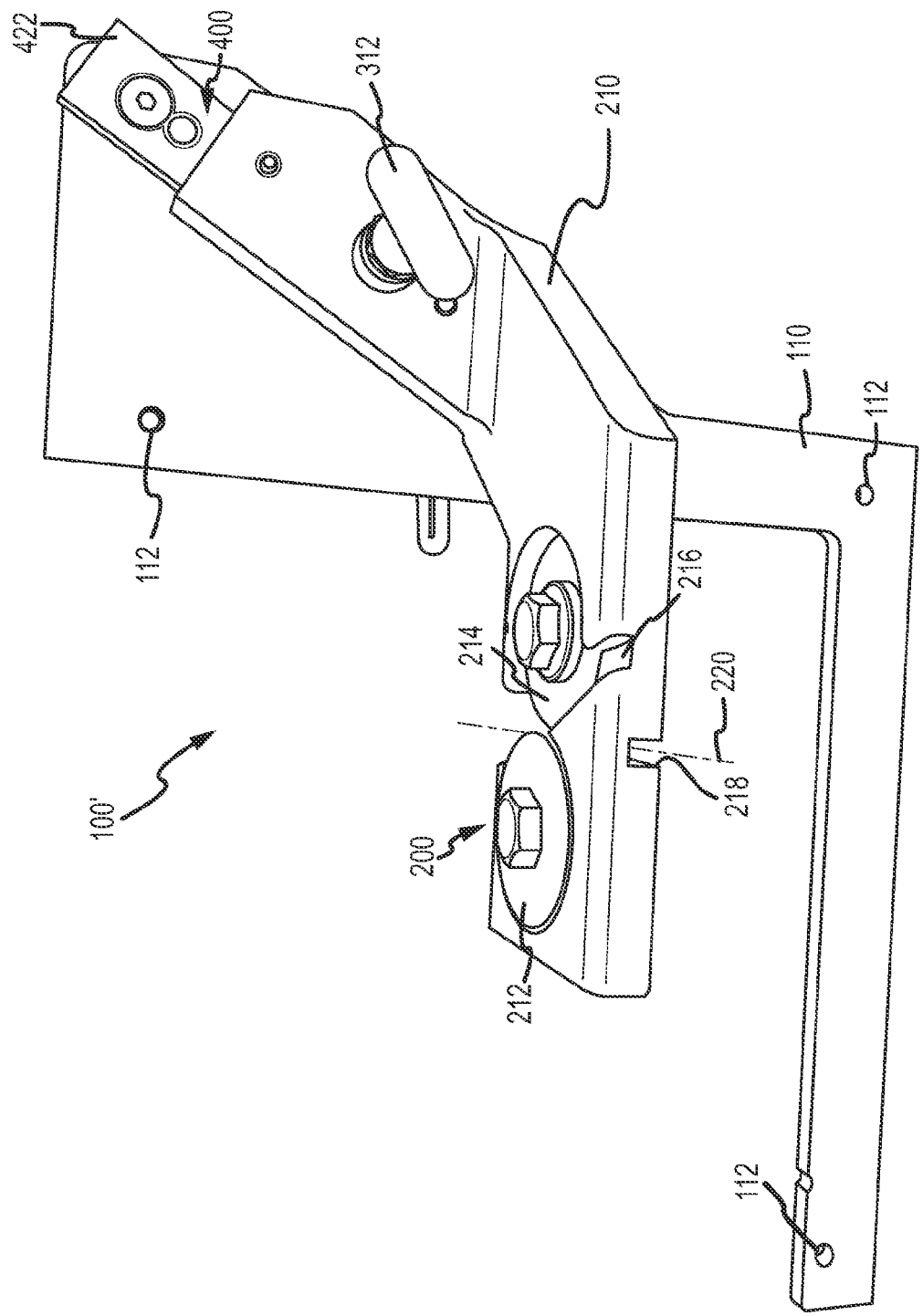
FIG. 18 is a perspective view of another embodiment of a cutting assembly.
Figure 19:
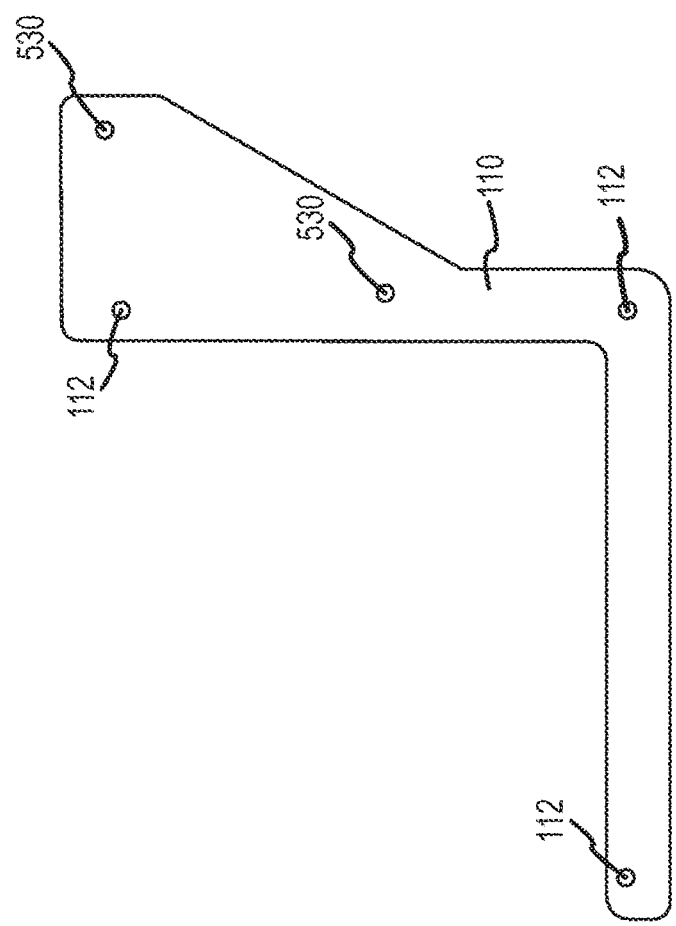
Figure 24:
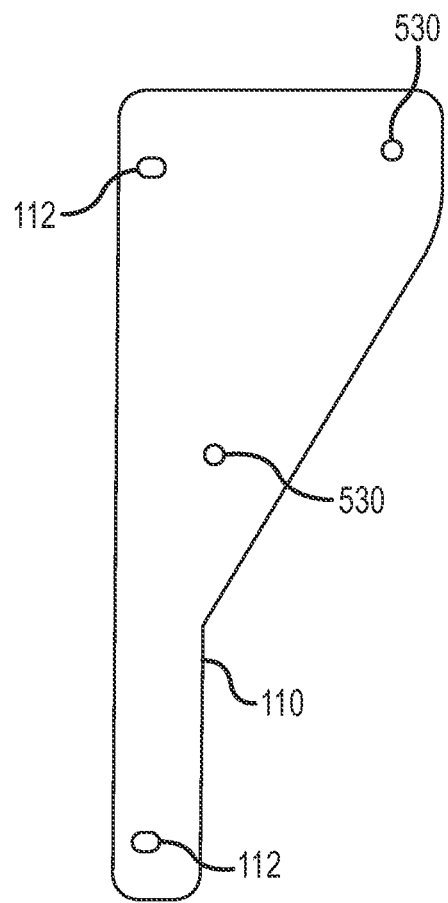

FIGS. 18-23 relate to another embodiment of a cutter 100'. Like reference numerals will be used to denote components common to the embodiment of the cutter 100' described above. As shown in FIG. 18, the frame 110 of the cutter 100' may include a generally L-shaped member. In this regard, the frame 110 may include a plurality of mounting holes 112 for attachment of the frame 110 to the discharge 16 of a seamless gutter machine. As the frame 110 is L-shaped, the frame 110 may attach to generally two sides of the discharge 16 rather than extending about the discharge entirely forming an aperture 118 as described above. This L-shaped frame 110 may accommodate easier mounting to the seamless gutter machine and may also accommodate other fixtures at the discharge of the seamless gutter machine such as, for example, a guillotine cutter 538 (e.g., shown in FIG. 1). In yet another embodiment shown in FIG. 24, the frame 110 may extend along a single edge of the discharge of the seamless gutter machine. As such, the frame 110 may attach using two mounting bolts arranged along one single edge of the discharge. In further embodiments, the frame 110 may be attached with a single bolt. Furthermore, FIG. 24 depicts that the mounting holes 112 may be provided out of round. For example, the mounting holes 112 may be slightly oblong to allow for fine adjustments in relation to the positioning of the cutter 100' relative to the discharge of the seamless gutter machine. Furthermore, the mounting holes 112 may be slightly oversized provide for adjustments in both the vertical and horizontal aspects for fine tune adjustment of the positioning of the cutter 100' relative to the discharge of the seamless gutter machine.

Figure 20:
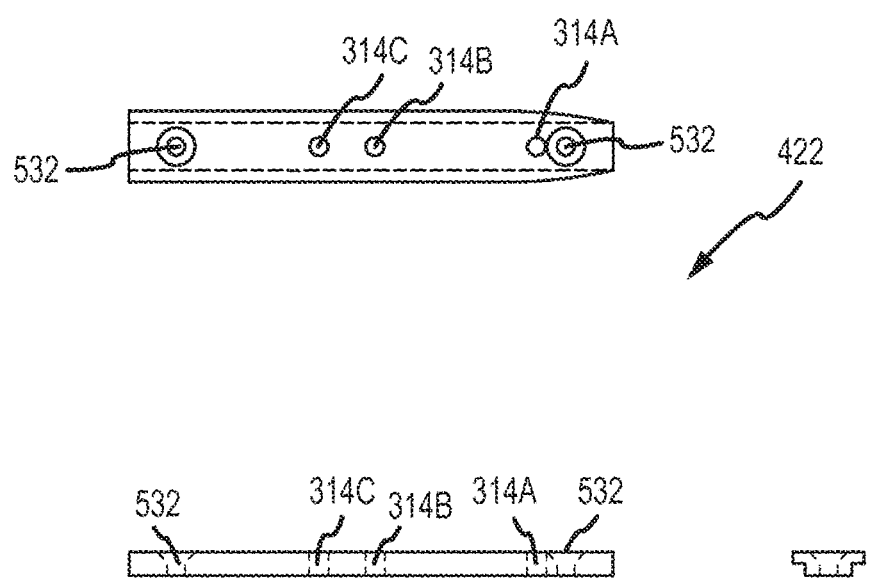
Figure 21:
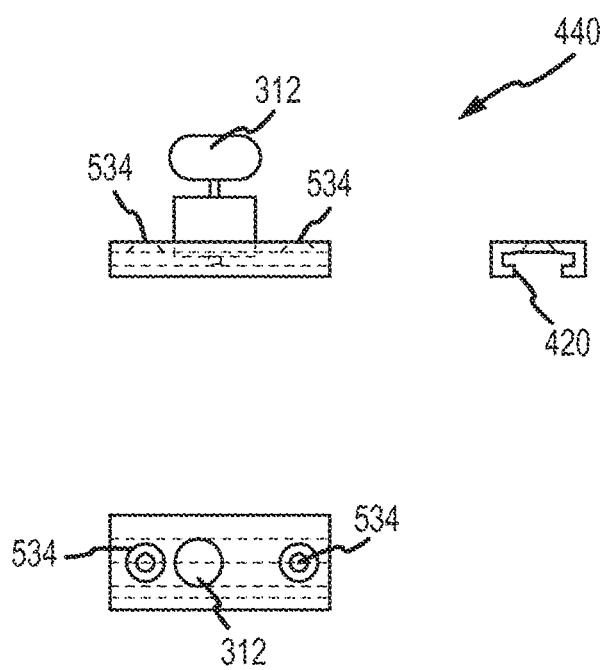
Figure 22:
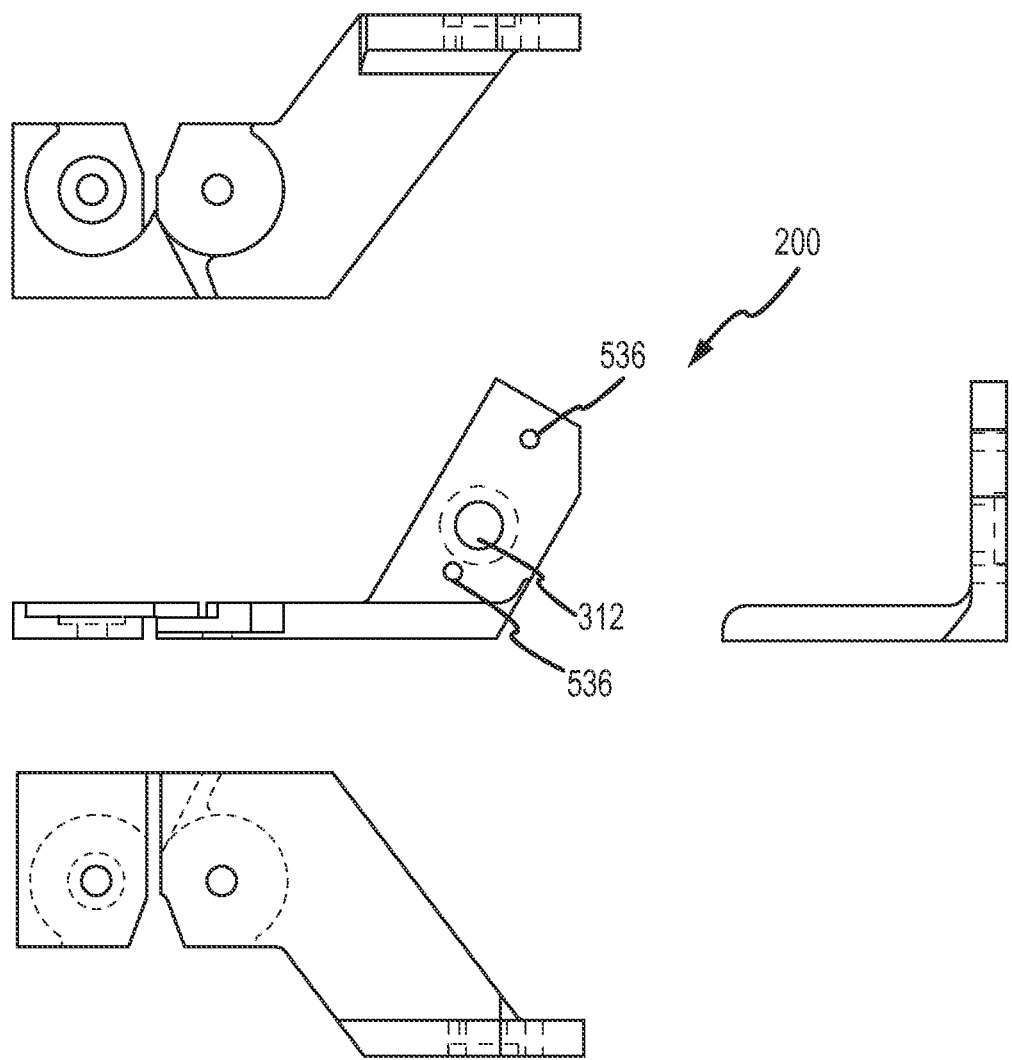

The frame 110 may be attached a rail 422 (best seen in FIG. 20). The rail 422 may include mounting holes 532 that coordinate with mounting holes 530 on the frame (shown in FIG. 19). The rail 422 may also include indexing holes 314A, 314B, and 314C that allow for positioning of the cutting assembly 200 in various positions as described above. Namely, a mounting plate 440 as shown in FIG. 21 may include an integrated slider 422 that interfaces with the rail 422 for sliding engagement of the rail 422 by the slider 422 of the mounting plate 440. The mounting plate 440 may accommodate or include an indexing pin 312 that may engage the indexing holes 314A, 314B, and 314C to position the mounting plate 440 in various positions relative to the rail 422. The mounting plate 440 may have attached thereto the cutting assembly 200 by way of interaction between mounting holes 534 on the mounting plate 440 and mounting holes 536 on the cutting assembly 200. The indexing pin 312 may pass through a hole in the cutting assembly 200 as shown in FIG. 18 for access by a user to slide the mounting plate 440 and attached cutting assembly 200 between various positions as described above. As best seen in FIG. 18, the cutting assembly 200 may include an upper cutting roller 212 and a lower cutting roller 214, which are also depicted in FIG. 23. In this regard, the cutting assembly 200 may have a design similar to that described above for cutting material advanced relative to the cutting assembly 200 along the cutting axis 220.

In relation to any of the foregoing embodiments of the cutter 100 or 100', it may be appreciated that the cutters may be manufactured in any appropriate manner using any appropriate material. For instance, various ones of or all of the components above may be manufactured using appropriate techniques such as casting, forging, machining, or other appropriate manufacturing technique. The components may be made from any appropriate material including, for example, polymer, metal, or the like. For instance, various ones of or all of the components described above may be manufactured from steel, stainless steel, aluminum, or other appropriate metals.

As discussed above briefly, formed gutters 20 are affixed to a building or the like at a pitch or predefined angle to control the direction in which water entering the formed gutter 20 flows to direct runoff water away from the building in a predetermined desired manner. As may be appreciated, the amount of pitch (i.e., the angle) at which the formed gutter 20 is attached to the building relative to horizontal (i.e., relative to gravity) may be important to correctly control the flow of water directed by the gutter 20. As will be described in greater detail below, the selective removal of a portion 38 of the back wall 26 of the formed gutter 20 may assist in providing the necessary amount of pitch to a formed gutter 20 for a given length of gutter 20 when mounted to a building (e.g., especially in the context of relatively long lengths of formed gutter 20).

Figure 17A:
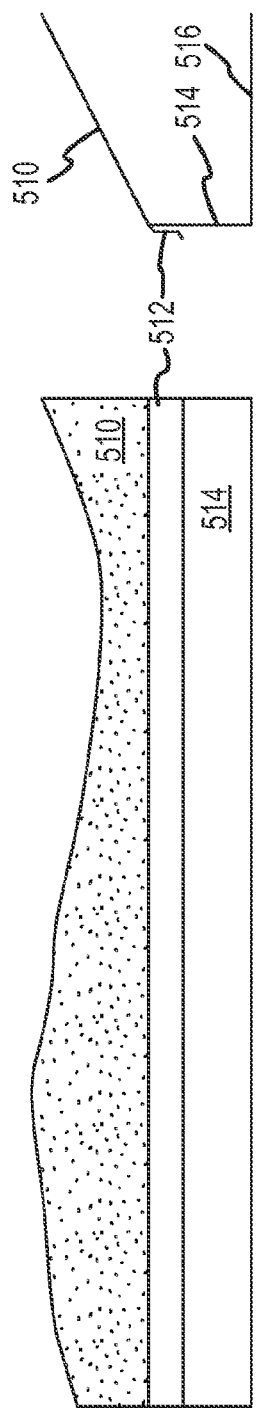
FIGS. 17A-17C depict an embodiment of a gutter attachment point of a building with gutters of different configurations attached thereto.
Figure 17B:
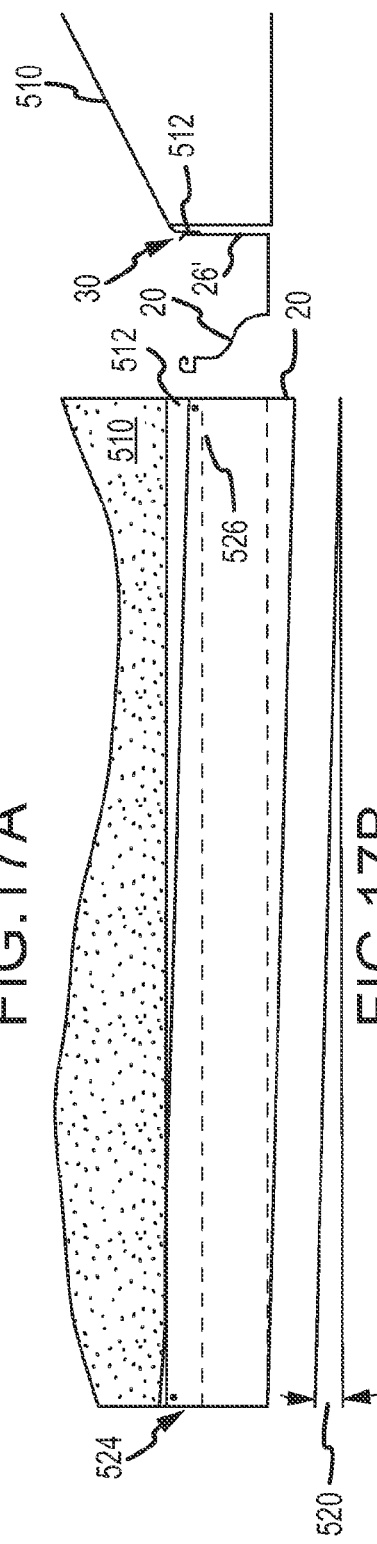

In this regard, FIG. 17A depicts a typical mounting structure to which formed gutter 20 is mounted on a building. In this regard, a gutter apron 512 is generally disposed between roofing material and an underlying substrate of the roof pitch 510. In this regard, the gutter apron 512 extends a partial distance adjacent to a fascia board 514. The fascia board 514 is disposed at the end portion of the roof soffit 516. The formed gutter 20 is generally attached to the fascia board 514 as shown in FIG. 17B. In this regard, a first end of the formed gutter 524 is attached to the fascia board 514 such that the gutter apron 512 overlaps the back upper edge of the back wall 26 of the formed gutter 20. In this regard, the gutter apron 512 overlaps the back wall 26 of the formed gutter 20 to help reduce water traveling behind the gutter 20 to the fascia board 514. A second end 526 of the formed gutter 20 is attached to the fascia board 514 such that a free end of the gutter apron 512 opposite the roof pitch 510 overlaps the back upper edge of the back wall 26 of the gutter 20. As can be appreciated, the resulting pitch provided by the differential in height between the first end 524 and the second end 526 of the formed gutter 20 results in a pitch angle 520 for the gutter as shown relative to horizontal in FIG. 17B.

Figure 17C:
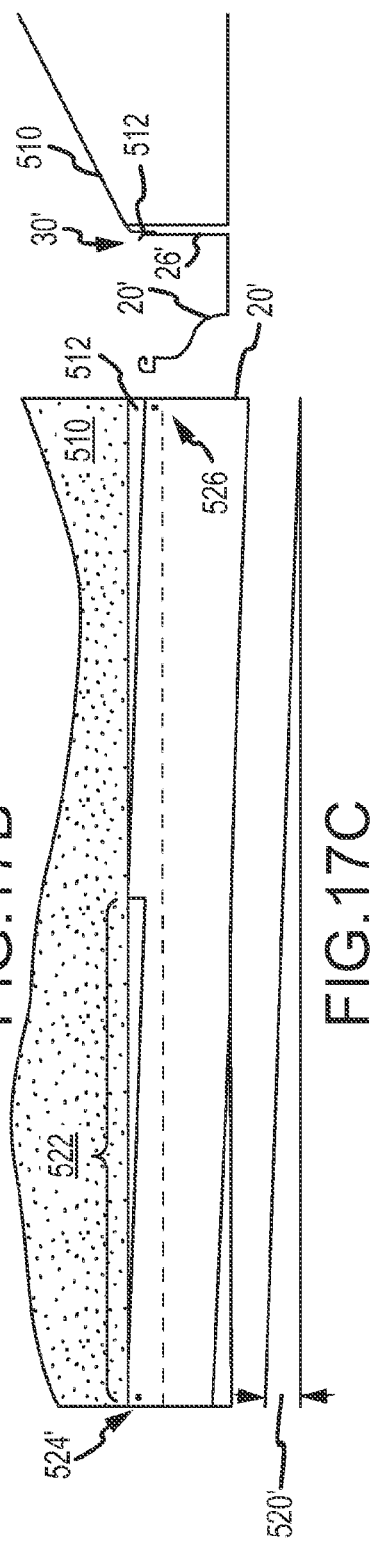

However for a given length of formed gutter 20 to be attached to a building, the differential in height between the first end 524 and the second end 526 of the formed gutter 20 may be insufficient to provide the requisite amount of pitch over the given length of the formed gutter 20 while maintaining overlap between the gutter apron 512 and the back wall 26 of the gutter 20. In this regard and with further reference to FIG. 17C, a former gutter 20' is provided that includes a section 522 along which the upper portion 38 of the back wall 26 of the gutter 20' has been removed as described above. As such, the first end 524' of the formed gutter 20' is affixed to the fascia board 514 such that the gutter apron 512 overlaps the resulting top edge 30' of the back wall 26' of the gutter 20' after the upper portion 38 of the back wall 26' has been removed therefrom. The second end 526 of the formed gutter 20' is attached to adjacent to the fascia board 514 such that the free end of the gutter apron 512 overlaps the back wall 26 of the formed gutter 20 as shown in FIG. 17C. In effect, the removal of the upper portion 38 of the back wall 26 of the formed gutter 20' along the cut section 522 provides additional lift to the first end 524' of the formed gutter 20'. Accordingly and as can be appreciated in FIG. 17C, the resulting pitch angle 520' is greater for a length of formed gutter 20' shown in FIG. 17C than the pitch angle 520 for the same length of formed gutter 20 shown in FIG. 17B. For a given length of gutter 20', the additional lift provided by the cut section 522 of the gutter 20' may provide the necessary additional pitch angle 520".

The cutter 100 or 100' described above may be of particular benefit in cutting the portion 522 of the gutter 20' to achieve a desired increased pitch angle 520' to facilitate installation of a given length of gutter 20'. Furthermore, as the cutter 100 or 100' may allow for cutting of the formed gutter 20 upon discharge from the seamless gutter machine 10 in response to the seamless gutter machine 10 advancing the formed gutter 20 from the discharge, a user may be alleviated from the manual process of cutting the section 522 of the formed gutter 20 to remove the upper portion 38 of the back wall 26 to achieve the additional pitch angle 520'. The cutter 100 or 100' may therefore provide an efficient, safe, and controllable way in which to cut the formed gutter 20 in contexts where removal of a portion of the back wall 26 is necessary to achieve the additional pitch angle 520' as described above in relation to FIG. 17C. Accordingly, use of the cutter 100 or 100' may beneficially reduce the cost and/or time associated with a gutter installation process.

Furthermore, providing larger pitch (e.g., greater angle relative to horizontal) may provide the benefits described above in relation to a more aesthetically pleasing gutter finish by reducing the amount of gutter apron shown. Furthermore, the larger pitch may allow for greater flexibility in determining where to locate downspouts for the gutters. Further still, potential benefits in relation to reduction in sediment deposits and prevention of overtopping of the gutters may also be realized as described above.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A cutter for use with a seamless gutter machine, comprising:
    a frame having a slider assembly, index pins and index holes, wherein the slider assembly extends diagonally; and
    a cutting assembly supportably engaged by the frame that is attachably engageable with a discharge of a seamless gutter machine, wherein the seamless gutter machine discharges a formed gutter along a longitudinal axis extending from the discharge, the formed gutter comprising a front wall having a front upper edge, a back wall having back upper edge, and a bottom wall extending between the front and back walls and opposite the front and back upper edges;
        wherein the cutting assembly comprises a plurality of cutting rollers rotatably mounted to the cutting assembly and offset to have overlapping peripheral edges defining a cutting axis and wherein the formed gutter is moved through the cutting rollers to be cut along the cutting axis;
        wherein the cutting assembly is slidably positionable relative to the frame at the discharge of the seamless gutter machine among a first position where the cutting axis is parallel to the longitudinal axis and extends along the back wall of the formed gutter, a second position and a third position;
        wherein the slider assembly, the index pins and the index holes enable the cutting assembly to be slidably positioned and secured at the first position, the second position and the third position.

2. The cutter of claim 1, wherein when the cutting assembly is in the third position, the cutting axis is spaced apart from the formed gutter so that the cutting assembly does not contact the formed gutter.

3. The cutter of claim 1, wherein when in the first position, the cutting assembly engages a formed gutter of a first size discharged from the seamless gutter machine and when in the second position, the cutting assembly engages a formed gutter of a second size discharged from the seamless gutter machine.

4. The cutter of claim 3, wherein the first size of the gutter comprises a five-inch gutter.

5. The cutter of claim 4, wherein when in the first position, the cutting axis extends along the back wall at least about 0.25 of an inch (0.64 cm) from the back upper edge.

6. The cutter of claim 5, wherein when in the first position, the cutting axis extends along the back wall not more than about 0.75 of an inch (1.9 cm) from the back upper edge.

7. The cutter of claim 3, wherein the second size of the gutter comprises a six-inch gutter.

8. The cutter of claim 7, wherein when the cutting assembly is in the second position, the cutting axis extends along the back wall at least about 0.625 of an inch (1.6 cm) from the back upper edge.

9. The cutter of claim 8, wherein when the cutting assembly is in the second position, the cutting axis extends along the back wall not more than about 1 inch (2.5 cm) from the back upper edge.

10. The cutter of claim 2, wherein the cutting rollers are passive and contacts the formed gutter as the formed gutter is discharged from the seamless gutter machine to separate a portion of the back wall from the cutting axis to the back upper edge from the formed gutter.

11. The cutter of claim 1, wherein the cutting assembly is positionable relative to the frame without removal of the cutting assembly from the frame.

* * * * *